(12) United States Patent
Jin et al.

(10) Patent No.: US 11,096,044 B2
(45) Date of Patent: Aug. 17, 2021

(54) METHOD AND APPARATUS FOR REPORTING USER EQUIPMENT CAPABILITY IN WIRELESS COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/787,804

(22) Filed: Feb. 11, 2020

(65) Prior Publication Data

US 2020/0260265 A1 Aug. 13, 2020

(30) Foreign Application Priority Data

Feb. 13, 2019 (KR) .......................... 10-2019-0016844

(51) Int. Cl.
*H04W 72/04* (2009.01)
*H04W 8/24* (2009.01)

(52) U.S. Cl.
CPC ......... *H04W 8/24* (2013.01); *H04W 72/0453* (2013.01)

(58) Field of Classification Search
CPC ........ H04W 8/24; H04W 24/10; H04W 48/18
See application file for complete search history.

(56) References Cited

U.S. PATENT DOCUMENTS

| 9,258,769 | B2 * | 2/2016 | Ore ....................... H04W 48/20 |
| 10,154,455 | B1 * | 12/2018 | Govindassamy ...... H04H 20/38 |
| 2012/0064909 | A1 | 3/2012 | Lindoff et al. |

(Continued)

OTHER PUBLICATIONS

Huawei et al., UE overheating support in NR SA scenario, R2-1815142, 3GPP TSG-RAN WG2 #103bis, Sep. 28, 2018, Chengdu, China.

(Continued)

*Primary Examiner* — Michael T Vu
(74) *Attorney, Agent, or Firm* — Jefferson IP Law, LLP

(57) ABSTRACT

A method of operating a user equipment (UE) in a wireless communication system, and an apparatus therefor are provided. The method includes receiving, from a base station, a request message for reporting of UE capability, wherein the request message comprises information for a plurality of radio access technology (RAT) types and information for a frequency band list, determining UE capability information corresponding to at least one RAT type among the plurality of RAT types, based on the information for the plurality of RAT types and the information for the frequency band list, and transmitting, to the base station, the UE capability information, wherein the UE capability information corresponding to at least one RAT type comprises information for a frequency band corresponding to the at least one RAT type and information for bandwidth class of the frequency band corresponding to the at least one RAT type, and wherein the information for bandwidth class of the frequency band corresponding to the at least one RAT type comprises at least one bandwidth class corresponds to at least one of uplink or downlink.

16 Claims, 19 Drawing Sheets

(56) References Cited

U.S. PATENT DOCUMENTS

2018/0206113 A1* 7/2018 He .......................... H04W 8/24
2020/0351638 A1 11/2020 Kim et al.
2021/0045005 A1 2/2021 Wang

OTHER PUBLICATIONS

Huawei et al., CR on signalling introduction of UE overheating support in NR SA scenario, R2-1819179, 3GPP TSG-RAN2 Meeting#104, Dec. 4, 2018, Spokane, Washington, USA.
Ericsson, Extension of overheating indication parameters, R2-1818531 (revision of R2-1817930), 3GPP TSG-RAN WG2 #104, Nov. 5, 2018, Spokane, USA.
Huawei et al., UE overheating support for late drop, R2-1818035, 3GPP TSG-RAN2 Meeting#104, Nov. 2, 2018, Spokane, Washington, USA.
International Search Report dated Apr. 22, 2020, issued in International Application No. PCT/KR2020/000735.
3GPP TSG-RAN WG2 Meeting #98, R2-1706075, Hangzhou, China, May 15-17, 2021.
U.S. Non-Final Office Action dated Jun. 24, 2021, issued in U.S. Appl. No. 16/743,632.

* cited by examiner

METHOD AND APPARATUS FOR REPORTING USER EQUIPMENT CAPABILITY IN WIRELESS COMMUNICATION SYSTEM

CROSS-REFERENCE TO RELATED APPLICATION(S)

This application is based on and claims priority under 35 U.S.C. § 119 of a Korean patent application number 10-2019-0016844, filed on Feb. 13, 2019, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for reporting user equipment (UE) capability in a wireless communication system.

2. Description of Related Art

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

With the advancement of mobile communication systems, a method of reporting UE capability is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for generating candidate band combinations so as to report user equipment (UE) capability in a wireless communication system.

Additional aspects will be set forth in part in the description which follows and, in part, will be apparent from the description, or may be learned by practice of the presented embodiments.

In accordance with an aspect of the disclosure, a method of operating a user equipment (UE) in a wireless communication system is provided. The method includes receiving, from a base station, a request message for reporting of UE capability, wherein the request message comprises information for a plurality of radio access technology (RAT) types and information for a frequency band list, determining UE capability information corresponding to at least one RAT type among the plurality of RAT types, based on the information for the plurality of RAT types and the information for the frequency band list, and transmitting, to the base station, the UE capability information, wherein the UE capability information corresponding to at least one RAT type comprises information for a frequency band corresponding to the at least one RAT type and information for bandwidth class of the frequency band corresponding to the at least one RAT type, and wherein the information for bandwidth class of the frequency band corresponding to the at least one RAT type comprises at least one bandwidth class corresponds to at least one of uplink or downlink.

In accordance with another aspect of the disclosure, a method of operating a base station in a wireless communication system is provided. The method includes transmitting, to a user equipment (UE), a request message for reporting of UE capability, the request message including information for a plurality of RAT types and information for a frequency band list, and receiving, from the UE, UE capability information corresponding to at least one RAT type among the plurality of the RAT type, wherein the UE capability information corresponding to at least one RAT type comprises information for a frequency band corresponding to the at least one RAT type and information for bandwidth class of the frequency band corresponding to the at least one RAT type, and wherein the information for bandwidth class of the frequency band corresponding to the at least one RAT type comprises at least one bandwidth class corresponds to at least one of uplink or downlink In accordance with another aspect of the disclosure, a user equipment (UE) in a wireless communication system is provided. The UE includes a transceiver, and at least one processor configured to control the transceiver to receive, from a base station, a request message for reporting of UE capability, the request message comprising information for a plurality of RAT types and information for a frequency band list, determine UE capability information corresponding to at least one radio access technology (RAT) type among the plurality of RAT types, based on the information for the plurality of RAT types and the information for the frequency band list, and control the transceiver to transmit, to the base station, the UE capability information, wherein the UE capability information corresponding to at least one RAT type comprises information for a frequency band corresponding to the at least one RAT type and information for bandwidth class of the frequency band corresponding to the at least one RAT type, and wherein the information for bandwidth class of the frequency band corresponding to the at least one RAT type comprises at least one bandwidth class corresponds to at least one of uplink or downlink.

In accordance with another aspect of the disclosure, a base station in a wireless communication system is provided. The base station includes a transceiver, and at least one processor configured to transmit, to a user equipment (UE), a request message for reporting of UE capability, wherein the request message comprises information for a plurality of radio access technology (RAT) types and information for frequency band list, and receive, from the UE, UE capability information corresponding to at least one RAT type among the plurality of the RAT type, wherein the UE capability information corresponding to at least one RAT type comprises information for a frequency band corresponding to the at least one RAT type and information for bandwidth class of the frequency band corresponding to the at least one RAT type, and wherein the information for bandwidth class of the frequency band corresponding to the at least one RAT type comprises at least one bandwidth class corresponds to at least one of uplink or downlink.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
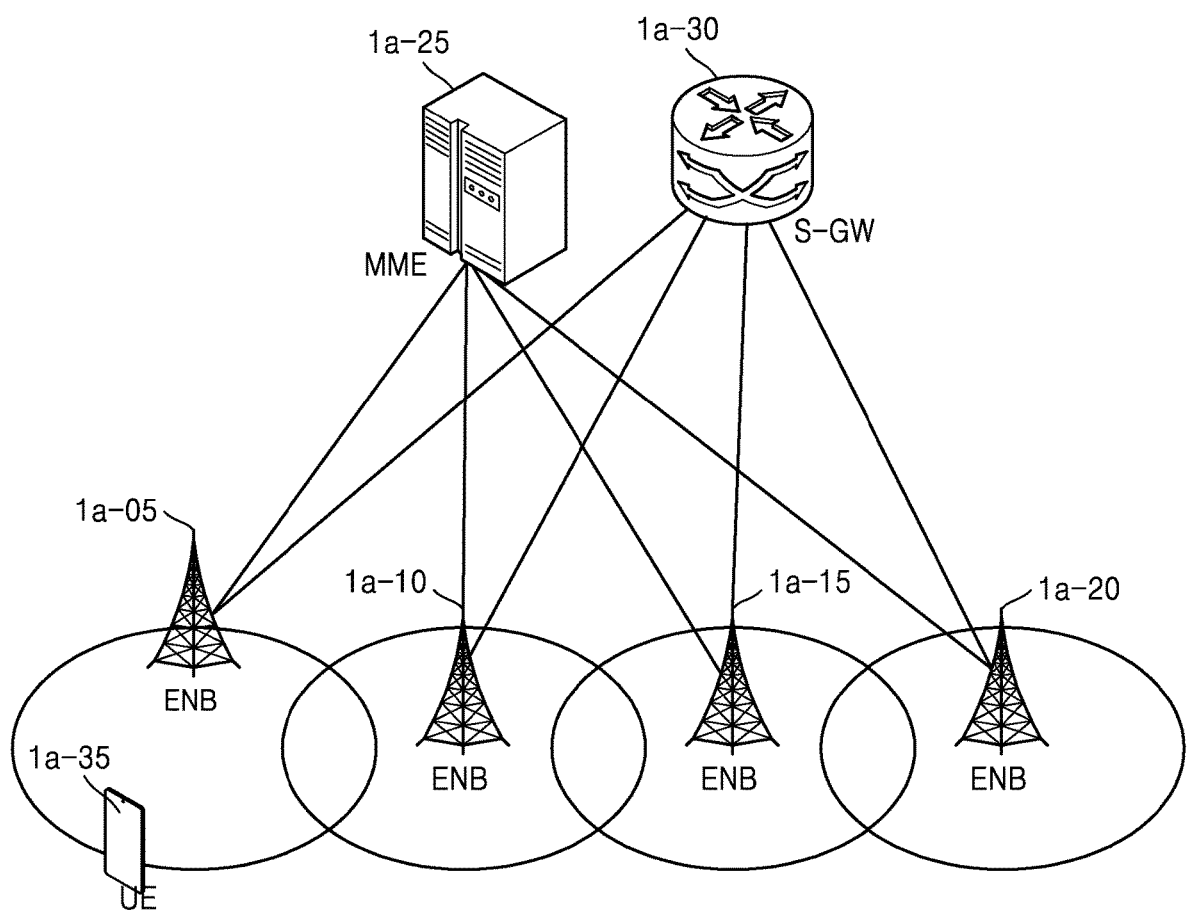
FIG. 1 shows a structure of a long-term evolution (LTE) system of wireless communication systems, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

A terminal may include user equipment (UE), a mobile station (MS), a cellular phone, a smart phone, a computer, or a multimedia system capable of communication.

In the disclosure, a controller may also be referred to as a processor.

In the disclosure, a layer (or layer device) may also be referred to as an entity.

Embodiments of the disclosure will be described in detail with reference to accompanying drawings. In the description of the disclosure, when it is determined that a detailed description of associated commonly-used technologies or structures may unnecessarily obscure the subject matter of the disclosure, the detailed description will be omitted. Further, terms, as will be mentioned later, are defined by taking functionalities in the disclosure into account, but may vary depending on practices or intentions of users or operators. Accordingly, the terms should be defined based on the descriptions throughout this specification.

Advantages and features of the disclosure, and methods for attaining them will be understood more clearly with reference to the following embodiments, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a fewer number of components and modules, or further divided into a greater number of components and modules. Moreover, the components and modules may be implemented to execute one or more central processing units (CPUs) in a device or security multimedia card. In embodiments, the module may include one or more processors.

Descriptions of some well-known technologies that possibly obscure the disclosure will be omitted, when necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the $3^{rd}$ generation partnership project long term evolution (3GPP LTE) will be used hereinafter. The disclosure is not, however, limited to the terms and definitions, and may equally apply to any systems that conform to other standards. In the disclosure, eNode B (eNB) may be interchangeably used with gNode B (gNB). For example, a base station referred to as an eNB may also be called a gNB. Furthermore, the term "terminal" or 'user equipment (UE)' may refer not only to a cell phone, an NB-IoT device, and a sensor but also to other wireless communication devices.

In the following description, a base station is an entity for performing resource allocation for UE, and may be at least one of a gNB, an eNB, a Node B, a base station (BS), a radio access unit, a base station controller, or a network node. A terminal may include user equipment (UE), a mobile station (MS), a cellular phone, a smart phone, a computer, or a multimedia system capable of communication. The disclosure is not limited thereto.

In particular, the disclosure may be applied to the 3GPP NR (which is the 5G mobile communication standard). The disclosure may be applied to intelligent services based on the 5G communication and IoT related technologies, e.g., smart home, smart building, smart city, smart car, connected car, health care, digital education, smart retail, security and safety services. In the disclosure, for convenience of description, eNB may be interchangeably used with gNB. For example, a base station referred to as an eNB may also be called a gNB. Furthermore, the term "terminal" or "user equipment (UE)" may refer not only to a cell phone, an NB-IoT device, and a sensor but also to another wireless communication device. Various embodiments of the disclosure may provide a method for a UE to report its capability, in particular, a bandwidth class of a particular band in a band combination for carrier aggregation (CA) or dual connectivity (DC), and an overall procedure for signaling conditions.

According to a first embodiment of the disclosure, when a UE in an NR system receives a radio resource control (RRC) UE capability request message requesting a report of UE capability for a radio access technology (RAT) type and band from a BS, and in particular, is requested for the UE capability for a plurality of RATs included in a plurality of containers, the UE generates candidate band combinations, and then generate and report a capability supported by the UE for each RAT. When conforming to a current standard intact, the UE may generate a candidate band combination for each RAT type. When a request for UE capability is made for a plurality of RAT types, repetitive operations for generating as many candidate band combinations as the number of RAT types may be performed. However, even when the operation for each RAT type is performed, the candidate band combination information may always have the same content. Hence, reducing unnecessary operations may be required.

According to a second embodiment of the disclosure, when a UE in an NR system receives an RRC UE capability request message requesting a report of UE capability for a RAT type and band from the BS, the UE may generate a band combination that the UE supports for each RAT type, thereby providing whether the band combination supports a bandwidth class in uplink (UL) or downlink (DL). The current standard is designed for the UE to skip providing bandwidth class information in both UL and DL for a band in a particular band combination but transmit only band index, but do not provide corresponding conditions and related operations. Various embodiments of the disclosure may provide specific UE operations for the aforementioned scenarios.

In various embodiments of the disclosure, when an NR UE is requested to report UE capability from a BS, the UE may add at least one of uplink or downlink bandwidth class information for a particular band to a report of the UE capability, thereby solving ambiguities in the UP operations recited in the existing standards. This may enable the BS to accurately understand the bandwidth class information actually supported by the UE in a particular band.

FIG. 1 shows a structure of an LTE system of wireless communication systems, according to an embodiment of the disclosure.

Referring to FIG. 1, a radio access network of the LTE system includes evolved Node Bs (hereinafter, also referred to as eNBs, Node Bs, or base stations (BSs)) 1a-05, 1a-10, 1a-15, and 1a-20, a Mobility Management Entity (MME) 1a-25, and a Serving Gateway (S-GW) 1a-30. A UE or a terminal 1a-35 may access an external network via the eNB 1a-05, 1a-10, 1a-15, or 1a-20, and the S-GW 1a-30.

The eNBs 1a-05 to 1a-20 of FIG. 1 correspond to existing Node Bs of a Universal Mobile Telecommunications System (UMTS) system. The eNB may be connected to the UE 1a-35 via a wireless channel, and may play a more sophisticated role than the existing node B does. In the LTE system, all user traffic including real-time services, such as Voice over IP (VoIP) services according to an Internet protocol may be served on a shared channel, so a device to collect status information, such as buffer status of UEs, available transmission power status, channel conditions, etc., for scheduling is required, and the eNBs 1a-05 to 1a-20 may serve as the device. A single eNB may generally control a number of cells. To achieve e.g., 100Mbps of transmission speed, the LTE system may use Orthogonal Frequency Division Multiplexing (OFDM) in e.g., 20MHz of bandwidth as a radio access technology. It also employs an Adaptive Modulation & Coding (AMC) scheme that determines a modulation scheme and a channel coding rate based on a channel condition of the UE. The S-GW 1a-30 is a device to provide a data bearer, producing or eliminating the data bearer under the control of the MME 1a-25. The MME 1a-25 is a device responsible for various control functions as well as mobility management functionality for the UE, and may be connected to a number of base stations.

Figure 2:
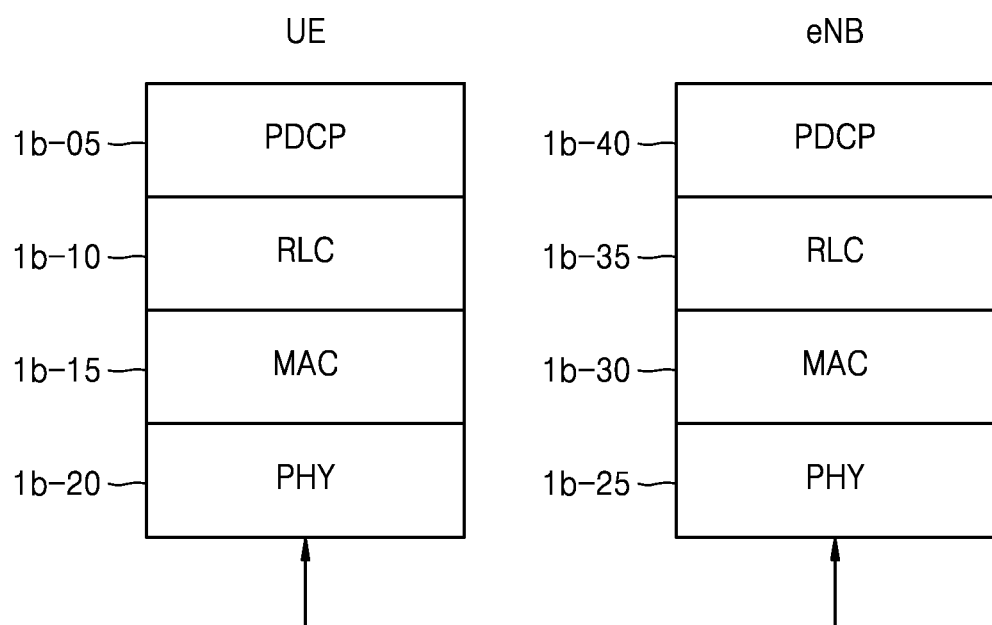
FIG. 2 shows a radio protocol architecture in an LTE system, according to an embodiment of the disclosure.

FIG. 2 shows a radio protocol architecture in an LTE system, according to an embodiment of the disclosure.

Referring to FIG. 2, the radio protocol of the LTE system in the UE and the eNB may each include a Packet Data Convergence Protocol (PDCP) layer 1b-05 or 1b-40, a Radio Link Control (RLC) layer 1b-10 or 1b-35, and a Medium Access Control (MAC) layer 1b-30 or 1b-25. The PDCP layer 1b-05 or 1b-40 may perform operation such as IP header compression/decompression. The main functions of the PDCP layer may be summarized as follows:
  header compression and decompression function (e.g., header compression and decompression: ROHC only)
  user data transfer function
  sequential delivery function (e.g., in-sequence delivery of upper layer Packet Data Units (PDUs) at PDCP re-establishment procedure for Radio Link Control Acknowledged Mode (RLC AM)
  reordering function (e.g., for split bearers in DC (only support for RLC AM): PDCP PDU routing for transmission and PDCP PDU reordering for reception)
  duplicate detection function (e.g., duplicate detection of lower layer Service Data Units (SDUs) at PDCP re-establishment procedure for RLC AM)
  retransmission function (e.g., retransmission of PDCP SDUs at handover and, for split bearers in DC, of PDCP PDUs at PDCP data-recovery procedure, for RLC AM)
  ciphering and deciphering function
  timer-based SDU discard function (e.g., timer-based SDU discard in uplink.)

The RLC layer 1b-10 or 1b-35 may reconfigure a PDCP PDU to be in a proper size, and perform operation, such as Automatic Repeat request (ARQ). The main functions of the RLC layer 1b-10 or 1b-35 may be summarized as follows:
  data transfer function (e.g., transfer of upper layer PDUs)
  ARQ function (e.g., Error Correction through ARQ (only for AM data transfer))
  concatenation, segmentation, and reassembling function (e.g., concatenation, segmentation and reassembly of RLC SDUs (only for Unacknowledged Mode (UM) and (Acknowledged Mode (AM) data transfer))

re-segmentation function (e.g., re-segmentation of RLC data PDUs (only for AM data transfer))

reordering function (e.g., reordering of RLC data PDUs (only for UM and AM data transfer))

duplicate detection function (e.g., duplicate detection (only for UM and AM data transfer))

error detection function (e.g., protocol error detection (only for AM data transfer))

RLC SDU discard function (e.g., RLC SDU discard (only for UM and AM data transfer))

RLC re-establishment function

The MAC layer 1b-15 or 1b-30 may be connected to a number of RLC layer devices configured in a single UE, for multiplexing RLC PDUs to a MAC PDU and demultiplexing RLC PDUs from a MAC PDU. The main functions of the MAC layer 1b-15 or 1b-30 may be summarized as follows:

mapping function (e.g., mapping between logical channels and transport channels)

multiplexing and demultiplexing function (e.g., multiplexing/demultiplexing of MAC SDUs belonging to one or different logical channels into/from transport blocks (TB) delivered to/from the physical layer on transport channels)

scheduling information report function hybrid automatic repeat request (HARQ) function (e.g., error correction through HARQ)

logical channel priority control function (e.g., priority handling between logical channels of one UE)

UE priority control function (e.g., priority handling between UEs by means of dynamic scheduling)

multimedia broadcast and multicast service (MBMS) service identification function transport format selection function padding function A physical (PHY) layer 1b-20 or 1b-25 may perform channel coding and modulation on upper layer data, form the data into OFDM symbols and transmit them on a radio channel, or may demodulate OFDM symbols received on a radio channel, perform channel decoding on them and transmit the result to an upper layer. Furthermore, even the physical layer may use a hybrid automatic repeat request (HARQ) for additional error correction, and a receiving end may transmit whether a packet has been received from a transmitting end in one bit. This is called HARQ ACK/NACK information. DL HARQ ACK/NACK information for UL transmission may be transmitted on a physical hybrid-ARQ indicator channel (PHICH) physical channel, and UL HARQ ACK/NACK information for DL transmission may be transmitted on a physical uplink control channel (PUCCH) or a physical uplink shared channel (PUSCH).

The PHY layer may include one or multiple frequencies/carriers, and a technology that assigns and uses multiple frequencies simultaneously is called carrier aggregation (CA). The CA may refer not to a method of using one carrier but to a method of using one primary carrier and one or multiple secondary carriers for communication between a UE and a BS or eNB. In the CA technology, a transmission amount may be significantly increased as much as the number of secondary carriers. In the LTE system, a cell of a BS using the primary carrier may be referred to as a primary cell (PCell), and a cell using the secondary carrier may be referred to as a secondary cell (SCell).

Although not shown, there are RRC layers above the PDCP layers of the UE and the base station. The UE and the BS may use the RRC layers to exchange configuration control messages related to access and measurement for radio resource control.

Figure 3:
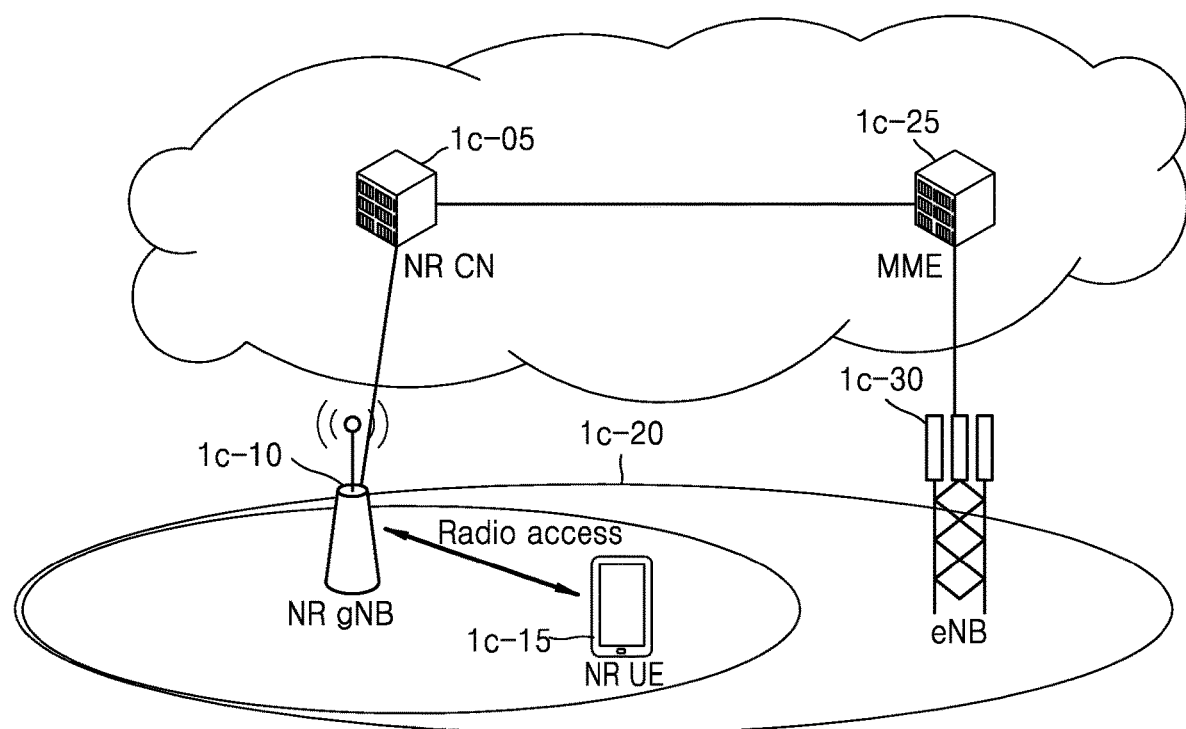
FIG. 3 shows a structure of a next generation mobile communication system, according to an embodiment of the disclosure.

FIG. 3 shows a structure of a next generation mobile communication system, according to an embodiment of the disclosure.

Referring to FIG. 3, a wireless access network of the next generation mobile communication system may include a new radio node B (NR NB) 1c-10, and a new radio core network (NR CN) or next generation core network (NG CN) 1c-05. A UE or a new radio UE (NR UE) 1c-15 may access an external network via the NR NB 1c-10 and the NR CN 1c-05.

Referring to FIG. 3, the NR NB 1c-10 may correspond to an eNB of the existing LTE system. The NR NB 1c-10 may be connected to the NR UE 1c-15 via a wireless channel, and may provide much better service than the existing node B does. In the next generation mobile communication system, all user traffic may be served on a shared channel, so a device to collect status information, such as buffer status of UEs, available transmission power status, channel condition, etc., for scheduling is required, and the NR NB 1c-10 may serve as the device. A single NR NB may generally control a number of cells. As compared with the existing LTE system, a bandwidth higher than the existing maximum bandwidth may be provided to achieve ultra-speed data transmission, and a radio access technology employing OFDM may be used and further combined with a beamforming technology. Furthermore, an AMC scheme that determines a modulation scheme and channel coding rate may be used based on a channel condition of the UE. The NR CN 1c-05 may perform such functions as supporting mobility, setting up a bearer, setting quality of service (QoS), etc. The NR CN 1c-05 is a device responsible for various control functions as well as mobility management functionality for the UE, and may be connected to a number of base stations. Moreover, the next generation mobile communication system may cooperate with the existing LTE system, in which case the NR CN 1c-05 may be connected to an MME 1c-25 through a network interface. The MME 1c-25 may be connected to an existing base station, eNB 1c-30.

Figure 15:
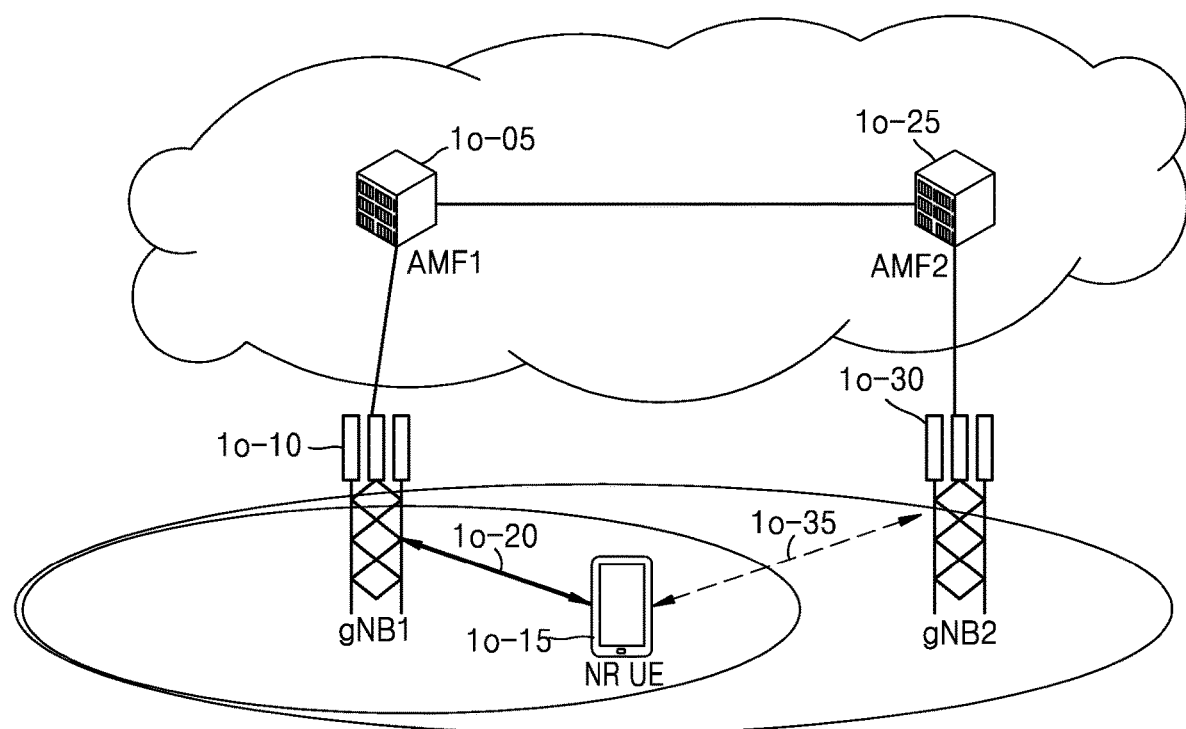
FIG. 15 shows a structure of NR dual connectivity (NR-DC), according to an embodiment of the disclosure.
Figure 16:
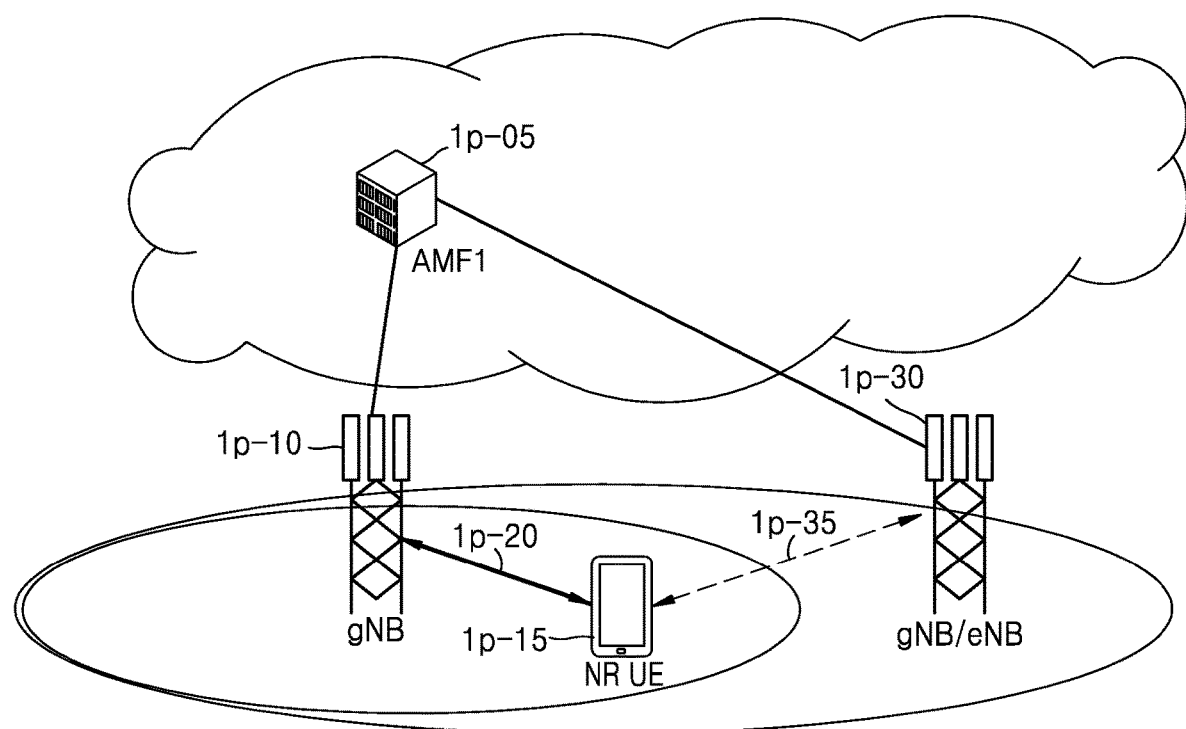
FIG. 16 shows a structure of NR-DC, according to an embodiment of the disclosure.

FIGS. 15 and 16 show examples of NR-DC structures, according to various embodiments of the disclosure.

Referring to FIGS. 15 and 16, the next generation mobile communication system (hereinafter, referred to as new radio (NR)) may include an NR NB (hereinafter, referred to as a gNB) 1o-10, 1o-30, or 1p-10, 1p-30 and an NR CN (hereinafter, referred to as an AMF) 1o-05, 1o-25, or 1p-05. An NR UE 1o-15 or 1p-15 may access an external network via the gNB 1o-10 or 1p-10 and the AMF 1o-05 or 1p-05. And, an NR UE 1o-15 or 1p-15 may access an external network via the gNB 1o-30 or 1p-30 and the AMF 1o-25 or 1p-05. And, the NR UE 1o-15 is connected with the gNB 1o-10 via a wireless interface 1o-20. And, the NR UE 1o-15 is connected with the gNB 1o-30 via a wireless interface 1o-35. And, the NR UE 1p-15 is connected with the gNB 1p-10 via a wireless interface 1p-20. And, the NR UE 1p-15 is connected with the gNB 1p-30 via a wireless interface 1p-35.

Referring to FIGS. 3, 15 and 16, a scenario in which there is a mixture of a macro cell and a pico cell may be considered. The macro cell is a cell controlled by an eNB and may provide services in a rather wide coverage. On the contrary, the pico cell is a cell controlled by an SeNB and may generally provide services in a remarkably small coverage as compared to the macro cell. There is no strict basis of distinguishing between the macro cell and the pico cell.

However, for example, it may be assumed that the macro cell has an area with about 500 m radius and the pico cell has an area with a radius of about tens of meters. In embodiments of the disclosure, the term pico cell may be interchangeably used with a small cell. In this case, the macro cell may correspond to an LTE BS (or macro eNB (MeNB)) or NR BS (or macro gNB (MgNB)), and the pico cell may correspond to an LTE BS (or Secondary eNB (SeNB)) or an NR BS (or secondary gNB (SgNB)). Especially, a 5G BS supporting the pico cell may use a frequency band above 6GHz.

In various embodiments of the disclosure, a scenario where there is a mixture of the macro cell and the pico cell (or secondary cell). The macro cell is a cell controlled by an eNB and may provide services in a rather wide coverage. In this case, for example, the macro cell may include an MeNB, which is an LTE BS, and an SeNB, which is another LTE BS. In another example, the macro cell may include an MeNB, which is an LTE BS, and an SgNB, which is an NR BS. In yet another example, the macro cell may include an MgNB, which is an NR BS, and an SeNB, which is an LTE BS. In still another example, the macro cell may include an MgNB, which is an NR BS, and an SgNB, which is another NR BS.

The 4G system (e.g., LTE) and the 5G system are all based on OFDM. While the LTE system has subcarrier spacing (SCS) fixed at 15 kilohertz (kHz), the 5G system may support a plurality of SCSs (e.g., 7.5 kHz, 15 kHz, 30 kHz, 60 kHz, 120 kHz, etc.) to provide various services (e.g., enhanced mobile broadband (eMBB) services, ultra-reliable low latency communication (URLLC) services, massive machine-type communication (mMTC) services, etc.) and provide wireless communication in various frequency ranges (e.g., sub-6 GHz range, above-6 GHz range, etc.) Furthermore, in the 5G system, time divisional multiplexing (TDM) or frequency divisional multiplexing (FDM) of a plurality of SCSs in a single carrier may be allowed. While it is assumed that a component carrier (CC) has up to 20 megahertz (MHz) bandwidth in the LTE system, up to 1 GHz bandwidth may be considered in the 5G system.

Accordingly, in the 5G system, radio resources having different SCS may be subject to FDM or TDM. A subframe is assumed to be the basic unit for scheduling in LTE, and a slot having 14 symbols is assumed to be the basic unit for scheduling in the 5G system. Specifically, the absolute time of the subframe is always set to 1ms in LTE, but the slot may have variable length based on the SCS in the 5G system.

Especially, for a synchronous signal (SS) used in an initial access procedure, an SS/physical broadcast channel (PBCH) block is defined by the 3GPP. The SS/PBCH block may include at least one of a primary SS (PSS), a secondary SS (SSS), or a PBCH. When the SS/PBCH block is transmitted, the PSS, the SSS, and the PBCH may be transmitted in a certain sequence. Furthermore, the SS/PBCH block may be transmitted with different SCS for each frequency band. For example, the SS/PBCH block may be transmitted with one of 15 kHz, 30 kHz, 120 kHz, and 240 kHz SCS for each frequency band. More specifically, for the sub-6 GHZ frequency band, the SS/PBCH block may be transmitted with 15 kHZ or 30 kHz SCS, and for the above-6 GHz frequency band, the SS/PBCH block may be transmitted with 120 kHz or 240 kHz SCS. Classifying the frequency band in more details may enable the SS/PBCH block to be transmitted for each frequency band. In this case, an SS/PBCH block for each frequency band may be made with the same SCS.

Alternatively, a number of SS/PBCH blocks may be transmitted in a single operation band. This is to allow UEs having different capabilities to coexist and operate in the system bandwidth. In this case, the system bandwidth increases, but a position of the SS/PBCH that the UE receives may be different depending on network settings. Transmission time of the SS/PBCH may also be different depending on the network settings. Furthermore, transmission intervals of SS/PBCH blocks may not be constant. More specifically, the information indicating channel bandwidth of a system like the following message may be configured to include an SCS value to be used in the channel bandwidth.

Table 1 provides an RF-Parameters information element according to an embodiment of the disclosure. The IE RF-Parameters used to convey RF-related capabilities for NR operation.

TABLE 1

RF-Parameters
The IE RF-Parameters is used to convey RF-Related capabilities for NR operation.
RF-Parameters information element

| | | |
|---|---|---|
| RF-Parameters ::= | SEQUENCE { | |
|     supportedBandListNR | SEQUENCE (SIZE (1..maxBands))OP BandNR, | |
|     supportedBandCombinationList | BandCombinatorList | OPTIONAL, |
|     appliedFreqBandListFilter | FreqBandList | OPTIONAL, |
|     ..., | | |
|     [[ | | |
|     supportedBandCombinationList-v1540 | BandCombinatonList-v1540 | OPTIONAL, |
|     srs-SwitchngTimeRequested | ENUMERATED (true) | OPTIONAL |
|     ]] | | |
| } | | |
| BandNR ::= | SEQUENCE { | |
|     bandNR | FreqaandIndicatorNR, | OPTIONAL, |
|     modifiedMPR-Behaviour | BOT STRING (SIZE (8)) | OPTIONAL, |
|     mimo-ParametersPerBand | MIMO-ParametersPerBand | OPTIONAL, |
|     extendedCP | ENUMERATED (supported) | OPTIONAL, |
|     multipleTCI | ENUMERATED (supported) | OPTIONAL, |
|     bwp-WithoutRestriction | ENUMERATED (supported) | OPTIONAL, |
|     bwp-SameNumerology | ENUMERATED (upto2, upto4) | OPTIONAL, |
|     bwp-DiffNumerology | ENUMERATED (upto4) | OPTIONAL, |
|     crossCarriersScheduling-SameSCS | ENUMERATED (supported) | OPTIONAL, |
|     pdsch-256QAM-FR2 | ENUMERATED (supported) | OPTIONAL, |
|     pusch-256QAM | ENUMERATED (supported) | OPTIONAL, |
|     us-PowerClass | ENUMERATED (pc1, pc2, pc3, pc4) | OPTIONAL, |
|     rateMatchingLTE-CBS | ENUMERATED (supported) | OPTIONAL, |

TABLE 1-continued

RF-Parameters
The IE RF-Parameters is used to convey RF-Related capabilities for NR operation.
RF-Parameters information element

```
  channelBWs-DL-v1530           CHOICE {
    fr1                           SEQUENCE {
      scs-15kHz                     BIT STRING (SIZE (10))        OPTIONAL,
      scs-30kHz                     BIT STRING (SIZE (10))        OPTIONAL,
      scs-60kHz                     BIT STRING (SIZE (10))        OPTIONAL
    },
    fr2                           SEQUENCE {
      scs-60kHz                     BIT STRING (SIZE (3))         OPTIONAL,
      scs-120kHz                    BIT STRING (SIZE (3))         OPTIONAL
    }
  }                                                               OPTIONAL,
  channelBWs-UL-v1530           CHOICE {
    fr1                           SEQUENCE {
      scs-15kHz                     BIT STRING (SIZE (10))        OPTIONAL,
      scs-30kHz                     BIT STRING (SIZE (10))        OPTIONAL,
      scs-60kHz                     BIT STRING (SIZE (10))        OPTIONAL
    },
    fr2                           SEQUENCE {
      scs-60kHz                     BIT STRING (SIZE (3))         OPTIONAL,
      scs-120kHz                    BIT STRING (SIZE (3))         OPTIONAL
    }
  }                                                               OPTIONAL,
  ...,
  [[
    maxUplinkDutyCycle-PC2-FR1  ENUMERATED (n60, n70, n80, n90, n100)
  OPTIONAL
  ]],
  [[
    pucch-SpatialRelInfoMAC-CE  ENUMERATED (supported)            OPTIONAL,
    powerBoosting-pi2BPSK       ENUMERATED (supported)            OPTIONAL
  ]]
}
-- TAG-RP-PARAMETERS-STOP
-- A WISTOP
```

Figure 4:
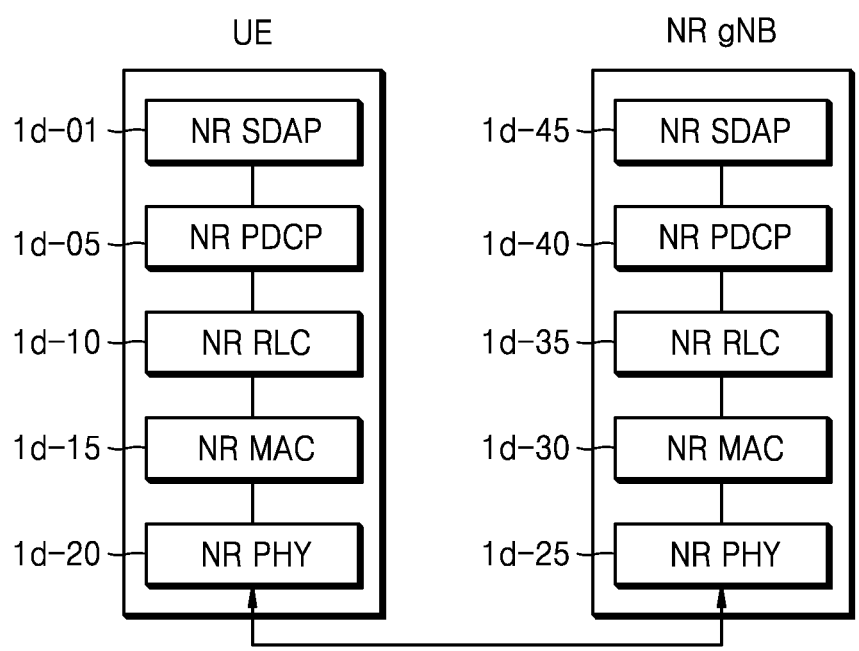
FIG. 4 shows a radio protocol architecture of a next generation mobile communication system, according to an embodiment of the disclosure.

FIG. 4 shows a radio protocol architecture of a next generation mobile communication system, according to an embodiment of the disclosure.

Referring to FIG. 4, a radio protocol of a next generation mobile communication system in each of a UE and an NR BS includes an NR service data adaptation protocol (SDAP) layer 1d-01 or 1d-45, an NR packet data convergence protocol (PDCP) layer 1d-05 or 1d-40, an NR radio link control (RLC) layer 1d-10 or 1d-35, an NR media access control (MAC) layer 1d-15 or 1d-30, and an NR physical (PHY) layer 1d-20 or 1d-25.

Main functions of the NR SDAP layer 1d-01 or 1d-45 may include some of the following functions:
  user plane data transfer function
  function of mapping between a QoS flow and a data bearer (DRB) for both DL and UL
  function of marking QoS flow ID for both UL and DL
  function of reflective QoS flow to DRB mapping for the UL SDAP PDUs For an SDAP layer device, the UE may receive configuration of whether to use a header of the SDAP layer device or whether to use a function of the SADP layer device for each PDCP layer device or each bearer or each logical channel in an RRC message. When the SDAP header is configured, a 1-bit non-access stratum (NAS) reflective QoS indicator (NAS reflective QoS) and a 1-bit access stratum (AS) reflective QoS (AS reflective QoS) may indicate for the UE to update or reconfigure the mapping information between the QoS flow and the data bearer for UL or DL. The SDAP header may include QoS flow ID information indicating QoS. The QoS flow ID information may be used for data process priority, scheduling, etc., for smoother services.

Main functions of the NR PDCP layer 1d-05 or 1d-40 may include some of the following functions:
  header compression and decompression function (e.g., header compression and decompression: Robust Header Compression (ROHC) only)
  user data transfer function
  sequential delivery function (e.g., in-sequence delivery of upper layer PDUs)
  non-sequential delivery function (e.g., out-of-sequence delivery of upper layer PDUs)
  reordering function (e.g., PDCP PDU reordering for reception)
  duplicate detection function (e.g., duplicate detection of lower layer SDUs)
  retransmission function (e.g., retransmission of PDCP SDUs)
  ciphering and deciphering function
  timer-based SDU discard function (e.g., timer-based SDU discard in uplink.)

Among the above functions, the reordering function of the NR PDCP device may refer to a function of reordering PDCP PDUs received from a lower layer based on PDCP sequence numbers (SNs). Furthermore, the reordering function of the NR PDCP device may include a function of transferring data to an upper layer in the reordered sequence or transferring the data directly to the upper layer without considering the sequence. Moreover, the reordering function of the NR PDCP device may include a function of reordering the sequence to record missing PDCP PDUs, a function of reporting status of missing PDCP PDUs to a transmitting end, or a function of requesting retransmission of missing PDCP PDUs.

Main functions of the NR RLC 1*d*-10 or 1*d*-35 may include some of the following functions:
- data transfer function (e.g., transfer of upper layer PDUs)
- sequential delivery function (e.g., in-sequence delivery of upper layer PDUs)
- non-sequential delivery function (e.g., out-of-sequence delivery of upper layer PDUs)
- ARQ function (e.g., error correction through ARQ)
- concatenation, segmentation, and reassembling function (e.g., concatenation, segmentation and reassembly of RLC SDUs)
- re-segmentation function (e.g., re-segmentation of RLC data PDUs)
- reordering function (e.g., reordering of RLC data PDUs)
- duplicate detection function
- error detection function (e.g., protocol error detection)
- RLC SDU discard function
- RLC re-establishment function Among the above functions, the sequential delivery function of the NR RLC device may refer to a function of delivering RLC SDUs received from a lower layer to an upper layer in sequence. The sequential delivery function of the NR RLC device may include a function of receiving, reassembling and delivering multiple RLC SDUs resulting from segmentation of an original RLC SDU, and a function of reordering the received RLC PDUs based on RLC SNs or PDCP SNs. Furthermore, the sequential delivery function of the NR RLC device may include a function of reordering the sequence to record missing RLC PDUs, a function of reporting status of missing RLC PDUs to a transmitting end, or a function of requesting retransmission of missing PDCP PDUs. Moreover, the sequential delivery function of the NR RLC device may include, when there is a missing RLC SUD, a function of delivering RLC SDUs before the missing RLC SDU to an upper layer in sequence, or when there is a missing RLC SDU but a timer is expired, a function of delivering all RLC SDUs received before the timer starts to an upper layer in sequence, or when there is a missing RLC SDU but a timer is expired, a function of delivering all RLC SDUs received up to the present to an upper layer in sequence. Furthermore, the sequential delivery function of the NR RLC device may include a function of delivering RLC PDUs to a PDCP device regardless of the sequence (out-of-sequence delivery) by processing the RLC PDUs in the order of reception (or in the order of arrival without regard to the order of the SNs). In addition, when RLC PDUs are segmented, the sequential delivery function of the NR RLC may include a function of delivering an RLC PDU to an PDCP device by reconstructing RLC PDU segments stored in a buffer or received later into a complete RLC PDU and processing the complete RLC PDU. The NR RLC layer may not include the concatenation function, and the concatenation function may be performed in the NR MAC layer or replaced with the multiplexing function of the NR MAC layer.

The non-sequential delivery function of the NR RLC device may refer to a function of delivering RLC SDUs received from a lower layer directly to an upper layer without regard to the sequence of the RLC SDUs. The non-sequential delivery function of the NR RLC device may include a function of receiving, reassembling and delivering multiple RLC SDUs resulting from segmentation of an original RLC SDU, and a function of storing RLC SNs or PDCP SNs of the received RLC PDUs and reordering the received RLC PDUs based on the RLC SNs or PDCP SNs to record missing RLC PDUs.

The NR MAC layer 1*d*-15 or 1*d*-30 may be connected to multiple NR RLC layer devices configured in the same UE, and main functions of the NR MAC layer 1*d*-15 or 1*d*-30 may include some of the following functions:
- mapping function (e.g., mapping between logical channels and transport channels)
- multiplexing and demultiplexing function (e.g., multiplexing/demultiplexing of MAC SDUs)
- scheduling information report function
- HARQ function (e.g., error correction through HARQ)
- logical channel priority control function (e.g., priority handling between logical channels of one UE)
- UE priority control function (e.g., priority handling between UEs by means of dynamic scheduling)
- MBMS service identification function
- transport format selection function
- padding function The NR PHY layer 1*d*-20 or 1*d*-25 may perform channel coding and modulation on upper layer data, form the data into OFDM symbols and transmit them on a radio channel, or may demodulate OFDM symbols received on a radio channel, perform channel decoding on them and transmit the result to an upper layer.

Figure 5:
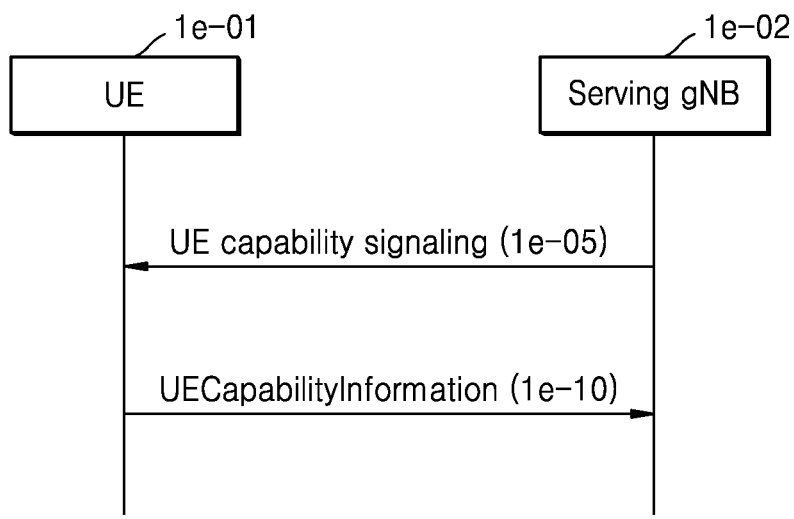
FIG. 5 shows a structure of a message reporting user equipment (UE) capability in a new radio (NR) system, according to an embodiment of the disclosure.

FIG. 5 shows a structure of a message reporting UE capability in a new radio (NR) system, according to an embodiment of the disclosure.

Referring to FIG. 5, a UE connected to a serving BS may report a capability supported by the UE to the serving BS. Hereinafter, the UE may refer to a UE 1*e*-01 and the BS may refer to a serving gNB 1*e*-02. In operation 1*e*-05, the BS may transmit a UE capability enquiry message requesting the UE connected to the BS to report a capability. The UE capability enquiry message may include a request for a UE capability for each RAT type. The request for each RAT type may include required frequency band information. The UE capability enquiry message may request a plurality of RAT types in a single RRC message container. The BS may transmit the UE capability enquiry message including the request for each RAT type to the UE multiple times. Specifically, in operation 1*e*-05, the UE capability enquiry messages may be repetitively transmitted. Then the UE may configure a UE capability information message in response to the UE capability enquiry message, and report it to the BS by matching the response to the request. In the next generation mobile communication system, a request for UE capability in NR, LTE, E-UTRAN New Radio-Dual Connectivity (EN-DC), and multi-RAT (MR)-DC may be made. For example, it is common to initially transmit the UE capability enquiry message after the UE makes a connection, but the UE capability enquiry may be requested whenever needed by the BS.

Upon receiving a request to report UE capability from the BS in the operation 1*e*-05, the UE may configure a UE capability for a RAT type and band information requested from the BS. How the UE configures the UE capability in an NR system will now be described.

1. When the UE receives an LTE and/or NR band list in the request for UE capability from the BS, the UE may compile a band combination (BC) for EN-DC and NR stand-alone (SA). Specifically, the UE may compile a candidate BC list for the EN-DC and NR SA based on bands requested from the BS in FreqBandList. This operation may be defined as a candidate BP compiling operation. Priorities of the bands may be set in the listed order of being listed in FreqBandList. This operation is performed once no matter what RAT type is, so that it may be commonly used in any RAT type procedure.

2. When "eutra-nr-only" flag or "eutra" flag is set, those for NR SA BCs among the candidate BC list compiled in the first operation may be completely discarded. This may happen when an LTE eNB requests an "eutra" capability.

3. Subsequently, the UE may discard fallback BCs from the candidate BC list. The fallback BC may refer to a BC in which bands corresponding to at least one SCell is removed from a super set BC. As the super set BC may already cover the fallback BC, operation of reporting the fallback BC may be skipped. This operation may be applied even to MR-DC. That is, this operation may be applied to LTE bands. Remaining BCs after this operation may be called a final candidate BC list.

4. The UE may select BCs corresponding to a RAT type requested from among the final candidate BC list. In other words, the UE may select BCs to be reported. In this operation, the UE may configure supportedBandCombinationList in a set order. Specifically, the UE may configure BCs and UE capability to be reported in the order of preset RAT types. For example, the set order may refer to a sequence of NR, EUTRA-NR, and EUTRA. 5. Furthermore, the UE may compile featureSetCombination for the configured supportedBandCombinationList, and configure a "candidate feature set combination" list from the candidate BC list from which a list of the fallback BCs (including equal or low-level capability) is discarded. The candidate feature set combinations include all feature set combinations for NR and EUTRA-NR BCs, and may be obtained from feature set combinations of UE-NR-Capabilities and UE-MRDC-Capabilities containers.

Furthermore, when the requested RAT type is EUTRA-NR and has an influence on LTE or NR UE capability, featureSetCombinations may all be included in both the UE-MRDC-Capabilities and UE-NR-Capabilities containers. However, NR feature sets may be included exclusively in the UE-NR-Capabilities container. After the UE capability is configured, the UE may transmit a UE capability information message including a UE capability to the BS in operation 1e-10. The BS may then perform scheduling and transmission/reception management suitable for the UE based on the UE capability received from the UE.

In various embodiments of the disclosure, as described above, in a method of configuring and reporting a UE capability, when the BS requests a UE capability for a RAT type and a particular band in UE-CapabilityRAT-Containers, a scenario in which a plurality of UE-CapabilityRAT-Requests are delivered in UECapabilityEnquiry may be considered. There may be two independent embodiments of the disclosure.

In the first of the two embodiments, the first operation in the method of configuring and reporting UE capability as described above may be taken into account.

In the first embodiment of the disclosure, the first operation among operations of the UE configuring UE capabilities in the aforementioned NR system may be considered. In the current standard, the above operations 1 to 5 are all performed for each RAT type unlike in the first operation. In this case, however, the first operation to obtain a candidate band combination from FreqBandList may be repeated several times, which may end up in repetition of unnecessary operation. Hence, the first embodiment provides a UE operation to modify the repetition of unnecessary operations of the UE.

In the second of the two embodiments, when the UE indicates a particular band that supports CA and DC, the current standard specifies that whether a band in a particular BC is supported is indicated in frequency information and that information about what UL or DL bandwidth class for the band is optionally included. When the UE signals that it supports a particular band but discards bandwidth class information, the BS may not know what bandwidth is actually supported by the UE for the band. In other words, when conforming to the current standard, UE operations become obscure, leading to a difficulty in implementation of the BS (i.e., the BS may not understand what capability the UE actually has).

For example, in LTE, as in the following depiction, when the UE transmits its capability to the BS, a band number and a bandwidth class (BWC) are indicated for a particular band combination, and signaling of a DL BWC is supposed to be mandatory.

Table 2 provides a BandCombinationList information element.

TABLE 2

| BandCombinationList information element |
|---|
| -- ASN1START<br>BandCombinationList-r14 ::= SEQUENCE (SIZE (1..maxBandComb-r13)) OF BandCombination-r14<br>BandCombinaton-r14 ::= SEQUENCE (SIZE (1..maxSimultaneousBands-r10)) OF BandIndication-r14<br>BandIndication-r14 ::= SEQUENCE {<br>   bandEUTRA-r14                                    FreqBandIndicator-r11,<br>   ca-BandwidthClassDL-r14                 CA-BandwidthClass-r10,<br>   ca-BandwidthClassUL-r14                 CA-BandwidthClass-r10       OPTIONAL<br>}<br>-- ASN1STOP |

In NR, as in the following depiction, as supplementary uplink (SUL) and supplementary downlink (SDL) may be both supported, UL only or DL only support may be possible in a particular band, and in order for the UE to inform this, a BWC is optionally defined for the UE capability report for the particular band.

Table 3 provides a BandCombinationList information element. The IE BandCombinationList contains a list of NR CA and/or MR-DC band combinations (also including DL only or UL only band).

TABLE 3

BandCombinationList
The IE BandCombinationList contains a list of NR CA and/or MR-DC band combinations
(also including DL only or UL only band).
BandCombinationList information element

```
-- AUS13START
-- TAG-EANDCOMSTNATI9NLIBT-START
BandCombinationList ::-             SEQUNCE (SIZE (1..maxBandComb)) OF BandCombination
BandCombination ::=                 SEQUENCE {
    bandList                            SEQUENCE (SIZE (1..maxSimultaneousBands)) OF BandParameters,
    featureSetCombination               FeatureSetCombinationId,
    ca-ParametersEUTRA                  CA-ParametersEUTRA                  OPTIONAL,
    ca-ParametersNR                     CA-ParametersNR                     OPTIONAL,
    mrdc-Parameters                     MRDC-Parameters                     OPTIONAL,
    supportedBandwitdhCombinationSet        BIT STPIGC (SIZE (1..32))           OPTIONAL,
    powerClass-v1530                    ENUMERATED (pc2)                    OPTIONAL
}
BandParameters ::=                  CHOICE {
    eutra                               SEQUENCE {
        bandEUTRA                           FreqBanfIndicatorEUTRA,
        ca-BandwidthClassDL-EUTRA               CA-BandwidthClassEUTRA          OPTIONAL,
        ca-BandwidthClassUL-EUTRA               CA-BandwidthClassEUTRA          OPTIONAL
    },
    nr                                  SEQUENCE {
        bandNP                              FreqBandIndicatorNR,
        ca-BandwidthClassDL-NR                  CA-BandwidthClassNR             OPTIONAL,
        ca-BandwidthCassUL-NR                   CA-BandwidthCallNR              OPTIONAL
    }
}
-- TAG-RP-PARAMETERS-STOP
-- AUB1STOP
```

However, when strictly following the codes in the depiction, the UE may transmit an indication about the particular band of the BC but discard the BWC. However, the operation is not defined in the current standard, so what the signaling means needs to be clearly described.

Figure 6:
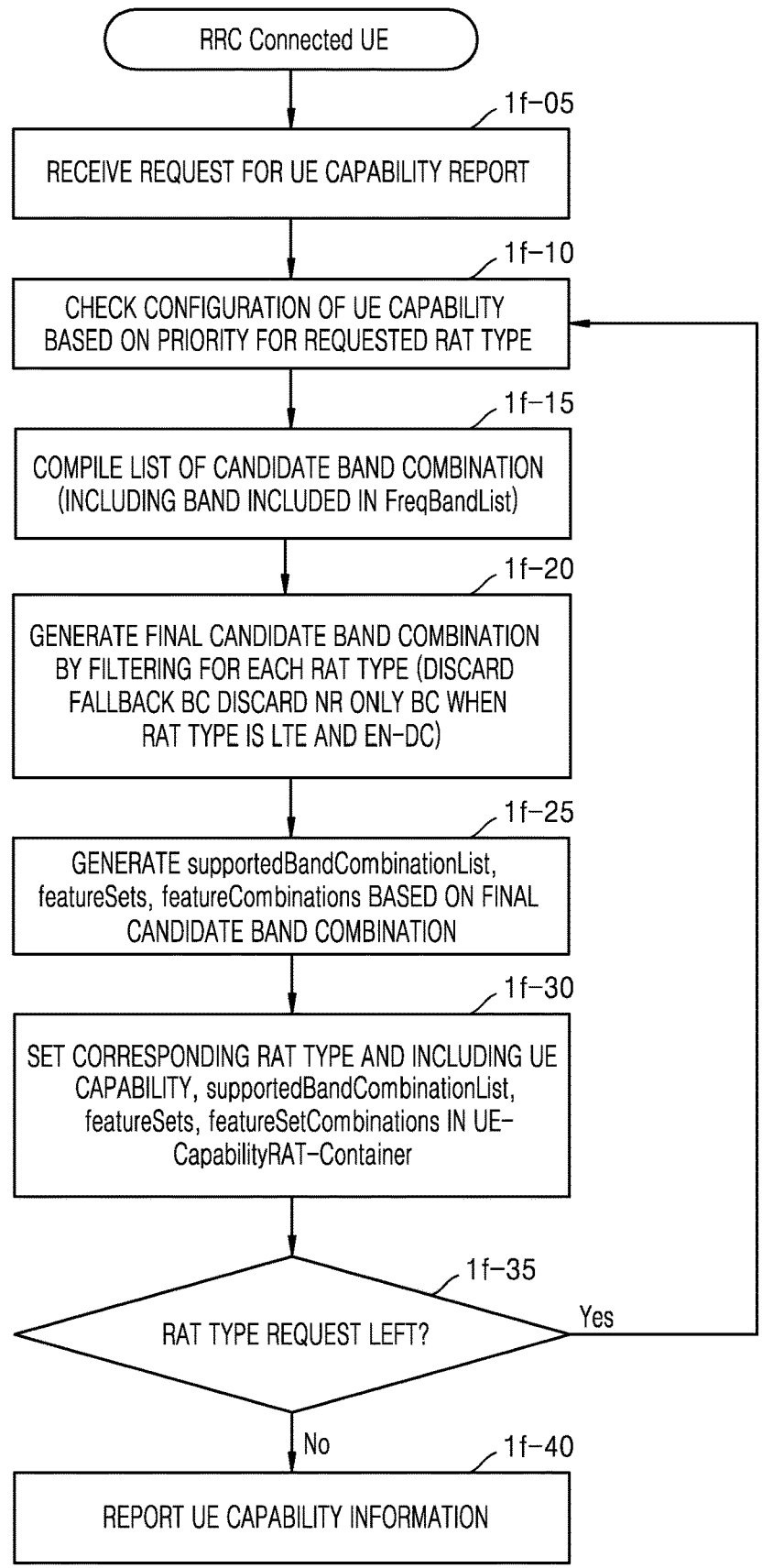
FIG. 6 is a flowchart illustrating an operation for reporting UE capability of a UE when UE capabilities for a plurality of radio access technology types are requested in a single UE capability enquiry, UECapabilityEnquiry, according to an embodiment of the disclosure.

FIG. 6 is a flowchart illustrating operation for a UE to report UE capability when UE capabilities for a plurality of RAT types are requested in a single UE capability enquiry, UECapabilityEnquiry, according to an embodiment of the disclosure.

A UE in an RRC connected state is requested from a BS to report UE capability in operation 1f-05. In operation 1f-05, a plurality of UE-CapabilityRAT-Requests may be transmitted to the UE in UECapabilityEnquiry, or the UE may be requested to report for a single RAT type. When the plurality of UE-CapabilityRAT-Requests may be transmitted to the UE in UECapabilityEnquiry in operation 1f-05, the UE configures a UE capability based on priorities of RAT types requested, in operation 1f-10. In NR, UE-CapabilityRAT-Containers may be configured based on the following priorities:
  ue-CapabilityRAT-Container for nr;
  ue-CapabilityRAT-Container for eutra-nr;
  ue-CapabilityRAT-Container for eutra;

When content for MR-DC is determined, a report for another RAT type may have additional priority, so the UE needs to report accordingly.

At the request to report UE capability for a particular RAT type in operation 1f-10, the UE first compiles candidate BCs based on frequency filtering information FreqBandList included in the RAT type container in operation 1f-15. That is, current and subsequent UE operations may be performed for the particular RAT type. For example, FreqBandList information may have consistency on an occasion when MR-DC and NR SA are both requested, which may mean that when a corresponding procedure is performed for each RAT type, the same procedure is repeated for every RAT type. In operation 1f-20, the UE performs filtering on the candidate BCs obtained in operation 10f-15 and generates final candidate BCs to be applied to the corresponding RAT type. The operations 2 and 3 as described above in connection with FIG. 5 may correspond to the filtering operation of operation 1f-20. The operations 2 and 3 as described above in connection with FIG. 5 are summarized as follows:

when "eutra-nr-only" flag or "eutra" flag is set, those for NR SA BCs among the candidate BC list may be discarded completely. This may happen when an LTE eNB requests an "eutra" capability.

Subsequently, the UE may discard fallback BCs from the candidate BC list. The fallback BC may refer to bands corresponding to at least one SCell in a super set BC. As the super set BC may already cover the fallback BC, operation of reporting the fallback BC may be skipped. This operation may be applied even to MR-DC. Specifically, the operation may be applied even to LTE bands. Remaining BCs after this operation may be called a final candidate BC list.

In operation 1f-25, the UE selects BCs corresponding to a RAT type requested from among the final candidate BC list. In other words, the UE may select BCs to be reported. In this operation, the UE may configure supportedBandCombinationList in a set order. That is, the UE may configure BCs and UE capability to be reported in the order of preset RAT types. For example, the set order may refer to a sequence of NR, EUTRA-NR, and EUTRA. In operation 1f-30, the UE may compile featureSetCombination for the supportedBandCombinationList generated in operation 1f-25, and configure a "candidate feature set combination" list from the candidate BC list from which a list of the fallback BCs (including equal or low-level capability) is discarded. The candidate feature set combinations include all feature set combinations for NR and EUTRA-NR BCs, and may be obtained from feature set combinations of UE-NR-Capabilities and UE-MRDC-Capabilities containers. Furthermore, when the requested RAT type is EUTRA-NR and has an influence on LTE or NR UE capability, featureSetCombinations may all be included in both the UE-MRDC-Capabilities and UE-NR-Capabilities containers. However, NR feature sets may be included exclusively in the UE-NR-Capabilities container.

In operation 1*f*-35, the UE determines whether there is a remaining RAT type in UE-CapabilityRAT-Request requested from the BS in UECapabilityEnquiry, and when there is a RAT type having lower priority than the previous RAT type and not having been dealt with, the UE performs the procedure starting from operation 1*f*-15 for the RAT type. When there is no RAT type left in UE-CapabilityRAT-Request in operation 1*f*-35, the UE transmits a UE capability message (information) collected for each RAT type to the BS in operation 1*f*-40.

Figure 7:
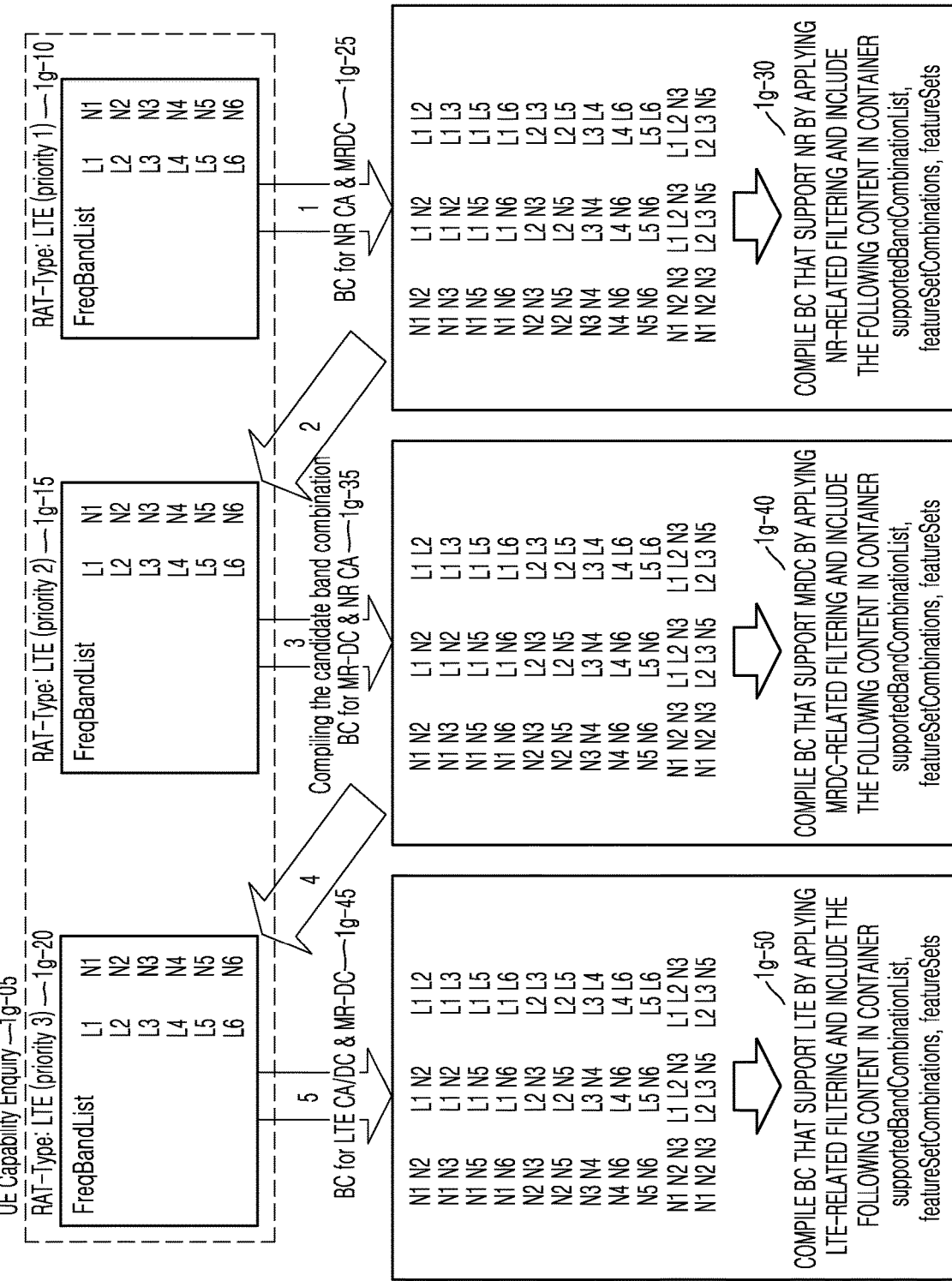
FIG. 7 is a diagram for explaining an example of an operation for reporting UE capability of a UE when UE capabilities for a plurality of radio access technology types are requested in a single UE capability enquiry, UECapabilityEnquiry, according to an embodiment of the disclosure.

FIG. 7 is a diagram for explaining an example of operation for a UE to report UE capability when UE capabilities for a plurality of RAT types are requested in a single UE capability enquiry, UECapabilityEnquiry, according to an embodiment of the disclosure. The entire UE operation as described above in connection with FIG. 6 is shown in an actual practice.

The BS may add requests for NR 1*g*-10, MR-DC 1*g*-15, and LTE 1*g*-20 to RAT types in a UE capability enquiry message 1*g*-05, so that the BS may transmit a request for UE capability to the UE, including FreqBandList for each RAT type. For example, the FreqBandList information may have consistency on an occasion when MR-DC and NR SA are both requested. The FreqBandList information included for each RAT type may have the same content (e.g., a frequency list), so that indexes of the feature sets reported by the UE may remain the same for MR-DC and NR SA. This may guarantee consistency in UE reporting. When the FreqBandList information is different for each RAT type, in particular for MR-DC and NR SA, supported BCs, feature sets, and feature set combinations may be compiled to be suitable for each RAT type. In this case, different feature set indexes may be used or a compatibility issue is introduced when the same feature set is indicated for MR-DC and NR SA. Referring to FIG. 7, on an occasion when a request is made for all NR, MR-DC, and LTE, it is assumed that FreqBandList includes LTE frequencies L1, L2, L3, L4, L5, and L6 and NR frequencies N1, N2, N3, N5, and N6. As described above, FreqBandList may include the same information for all RAT types for which UE capability is requested.

The UE may perform an operation to generate UE capabilities in the order of priority of NR, MR-DC, and LTE according to a set procedure. Specifically, the UE may generate candidate BCs by firstly taking FreqBandList for NR into account. In this case, all the candidate BCs that support NR SA and MR-DC may be selected, in 1*g*-25. Subsequently, in 1*g*-30, the UE may perform filtering on the selected candidate BCs for the corresponding RAT type, NR, and generate BCs, feature sets, and feature set combinations supported for NR. The information of BCs, feature sets, and feature set combinations may be contained in an NR UE capability container.

Subsequently, in 1*g*-35, the UE may check FreqBandList for MR-DC according to the set order of priority, and generate candidate BCs for MR-DC. In this case, all candidate BCs that support NR SA and MR-DC may be selected. Subsequently, in 1*g*-40, the UE may perform filtering on the selected candidate BCs for the corresponding RAT type, MR-DC, and generate BCs, feature sets, and feature set combinations supported for MR-DC. The information of BCs, feature sets, and feature set combinations may be contained in an MR-DC UE capability container.

In 1*g*-45, the UE may check FreqBandList for LTE according to the set order of priority, and generate candidate BCs for LTE. In this case, all candidate BCs that support LTE SA and MR-DC may be selected. Subsequently, in 1*g*-50, the UE may perform filtering on the selected candidate BCs for the corresponding RAT type, LTE, and generate BCs, feature sets, and feature set combinations supported for LTE. The information of BCs, feature sets, and feature set combinations may be contained in an LTE UE capability container.

As described above, in 1*g*-25, 1*g*-35, and 1*g*-45, the UE may repeat multiple times the operation to check FreqBandList included in a request for a particular RAT type and generate candidate BCs for the RAT type. However, the operation ends up with the same results, so the repetition of the operations may increase the burden of the UE.

Figure 8:
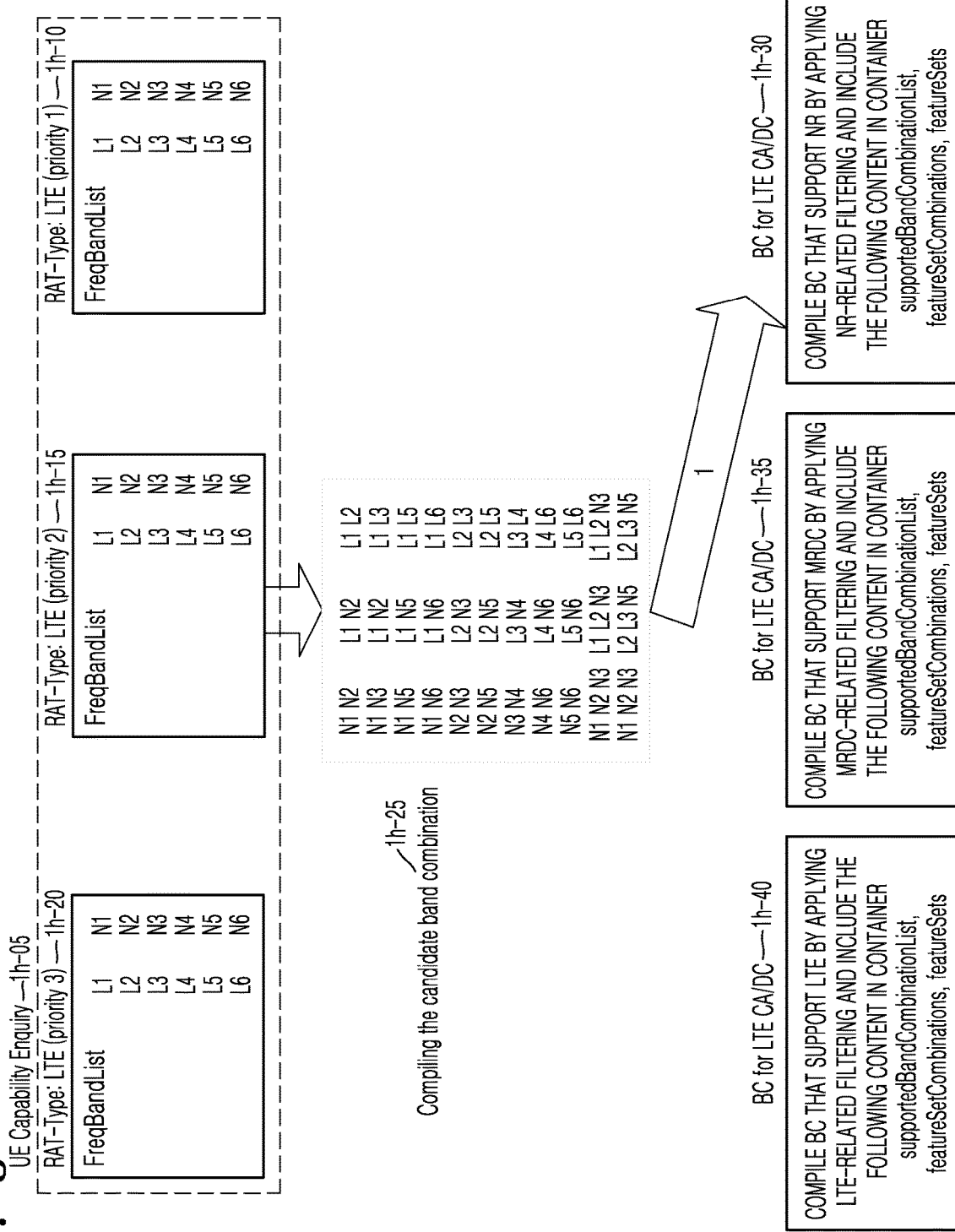
FIG. 8 is a diagram for explaining an example of an operation for reporting UE capability of a UE when UE capabilities for a plurality of radio access technology types are requested in a single UE capability inquiry, UECapabilityEnquiry, as a first process for configuring the UE capability, according to an embodiment of the disclosure.

FIG. 8 is a diagram for explaining an example of operation for a UE to report UE capability when UE capabilities for a plurality of RAT types are requested in a single UE capability inquiry, UECapabilityEnquiry, as a first process for configuring the UE capability, according to an embodiment of the disclosure. Results from the entire UE operations as described above in connection with FIGS. 6 and 7 are shown in an actual practice referring to FIG. 8.

Referring to FIG. 8, the BS may add requests for NR 1*h*-10, MR-DC 1*h*-15, and LTE 1*h*-20 to RAT types in a UE capability enquiry message 1*h*-05, so that the BS may transmit a request for UE capability to the UE, including FreqBandList for each RAT type. For example, the FreqBandList information may have consistency on an occasion when MR-DC and NR SA are both requested. The FreqBandList information included for each RAT type may have the same content (e.g., a frequency list), so that indexes of the feature sets reported by the UE may remain the same for MR-DC and NR SA. This may guarantee consistency in UE reporting. When the FreqBandList information is different for each RAT type, in particular for MR-DC and NR SA, supported BCs, feature sets, and feature set combinations may be compiled to be suitable for each RAT type. In this case, different feature set indexes may be used or a compatibility issue is introduced when the same feature set is indicated for MR-DC and NR SA. Referring to FIG. 8, on an occasion when a request is made for all NR, MR-DC, and LTE, it is assumed that FreqBandList includes LTE frequencies L1, L2, L3, L4, L5, and L6 and NR frequencies N1, N2, N3, N5, and N6. As described above, FreqBandList may include the same information for all RAT types for which UE capability is requested.

The UE may generate candidate BCs by taking the received FreqBandList into account. In this case, all the candidate BCs that support NR SA, LTE SA and MR-DC may be selected. In other words, operation 1*h*-25 is not performed for each RAT type, and the UE generates candidate BCs to be applied to all the RAT types before performing the operation for each RAT type, thereby making a difference in that subsequently, the UE may be able to use the candidate BCs.

In 1*h*-30, the UE may perform filtering on the candidate BCs selected in 1*h*-25 for the corresponding RAT type, NR, according to the priority, and generate BCs, feature sets, and feature set combinations supported for NR. The information of BCs, feature sets, and feature set combinations may be contained in an NR UE capability container.

Furthermore, in 1*h*-35, the UE may perform filtering on the selected candidate BCs for the corresponding RAT type, MR-DC, and generate BCs, feature sets, and feature set combinations supported for MR-DC. The information of BCs, feature sets, and feature set combinations may be contained in an MR-DC UE capability container.

In 1h-40, the UE may perform filtering on the selected candidate BCs for the corresponding RAT type, LTE, and generate BCs, feature sets, and feature set combinations supported for LTE. The information of BCs, feature sets, and feature set combinations may be contained in an LTE UE capability container.

According to the method as described above in connection with FIG. 8, candidate BCs to be generally applied to all RAT types may be first generated, and then a procedure of reporting UE capability may be performed using information corresponding to each RAT type in the order of priority. Accordingly, the UE may perform the process of generating the candidate BCs one time, which is otherwise repeated, so that the burden of the UE may be reduced.

Figure 9:
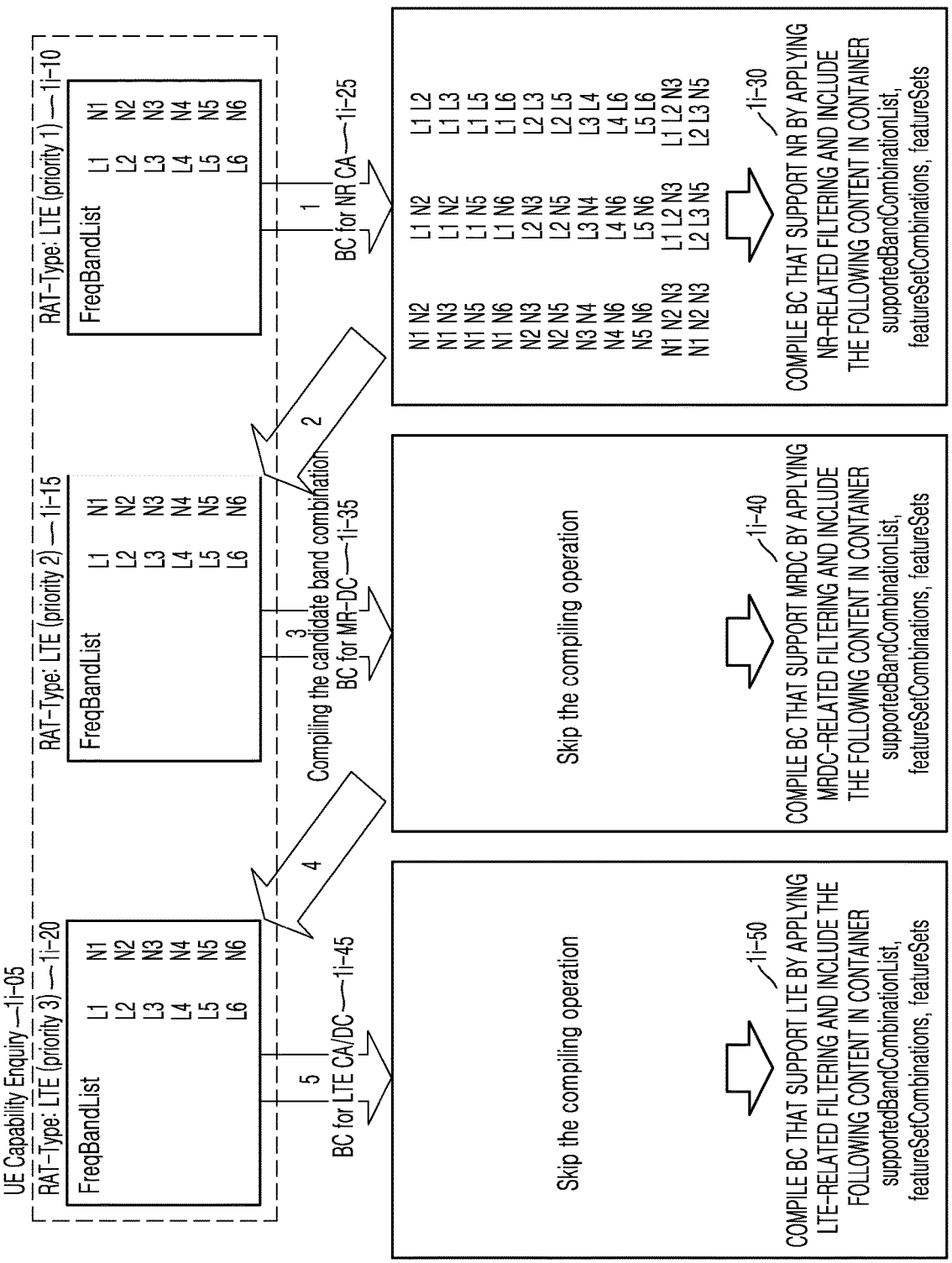
FIG. 9 is a diagram for explaining an example of an operation for reporting UE capability of a UE when UE capabilities for a plurality of radio access technology types are requested in a single UE capability inquiry, UECapabilityEnquiry, as a first process for configuring the UE capability, according to an embodiment of the disclosure.

FIG. 9 is a diagram for explaining an example of operation for a UE to report UE capability when UE capabilities for a plurality of RAT types are requested in a single UE capability inquiry, UECapabilityEnquiry, as a first process for configuring the UE capability, according to an embodiment of the disclosure. Results from the entire UE operations as described above in connection with FIGS. 6 and 7 are shown in an actual practice referring to FIG. 9.

Referring to FIG. 9, the BS may add requests for NR 1i-10, MR-DC 1i-15, and LTE 1i-20 to RAT types in a UE capability enquiry message 1i-05, so that the BS may transmit a request for UE capability to the UE, including FreqBandList for each RAT type. For example, the FreqBandList information may have consistency on an occasion when MR-DC and NR SA are both requested. The FreqBandList information included for each RAT type may have the same content (e.g., a frequency list), so that indexes of the feature sets reported by the UE may remain the same for MR-DC and NR SA. This may guarantee consistency in UE reporting. When the FreqBandList information is different for each RAT type, in particular for MR-DC and NR SA, supported BCs, feature sets, and feature set combinations may be compiled to be suitable for each RAT type. In this case, different feature set indexes may be used or a compatibility issue is introduced when the same feature set is indicated for MR-DC and NR SA. Referring to FIG. 9, on an occasion when a request is made for all NR, MR-DC, and LTE, it is assumed that FreqBandList includes LTE frequencies L1, L2, L3, L4, L5, and L6 and NR frequencies N1, N2, N3, N5, and N6. As described above, FreqBandList may include the same information for all RAT types for which UE capability is requested.

The UE may perform an operation to generate UE capabilities in the order of priority of NR, MR-DC, and LTE according to a set procedure. Specifically, the UE may generate candidate BCs by firstly taking FreqBandList for NR into account, and store the candidate BCs in a buffer. In this case, all the candidate BCs that support NR SA and MR-DC may be selected, in 1i-25. Subsequently, in 1i-30, the UE may perform filtering on the selected candidate BCs for the corresponding RAT type, NR, and generate BCs, feature sets, and feature set combinations supported for NR. The information of BCs, feature sets, and feature set combinations may be contained in an NR UE capability container.

Subsequently, in 1i-35, as the operation to check FreqBandList for MR-DC according to the set order of priority and generate candidate BCs for MR-DC was already performed by the UE in 1i-25 and the information about the generated candidate BCs are stored, the UE may skip the same operation but just use the stored information. In other words, in 1i-35, the UE may fetch the stored candidate BCs without performing the operation to generate the candidate BCs. Subsequently, in 1i-40, the UE may perform filtering on the stored candidate BCs for the corresponding RAT type, MR-DC, and generate BCs, feature sets, and feature set combinations supported for MR-DC. The information of BCs, feature sets, and feature set combinations may be contained in an MR-DC UE capability container.

In 1i-45, as the operation to check FreqBandList for LTE according to the set order of priority and generate candidate BCs for LTE was already performed by the UE in 1i-25 and the information about the generated candidate BCs are stored, the UE may skip the same operation but just use the stored information. In other words, in 1i-45, the UE may fetch the stored candidate BCs without performing the operation to generating the candidate BCs. Subsequently, in 1i-50, the UE may perform filtering on the selected candidate BCs for the corresponding RAT type, LTE, and generate BCs, feature sets, and feature set combinations supported for LTE. The information of BCs, feature sets, and feature set combinations may be contained in an LTE UE capability container.

According to the method as described above in connection with FIG. 9, candidate BCs to be generally applied to all RAT types may be generated once, and then a procedure of reporting UE capability may be performed using the information corresponding to each RAT type in the order of priority. Accordingly, the UE may perform the process of generating the candidate BCs one time, which is otherwise repeated, so that the burden of the UE may be reduced.

Figure 10:
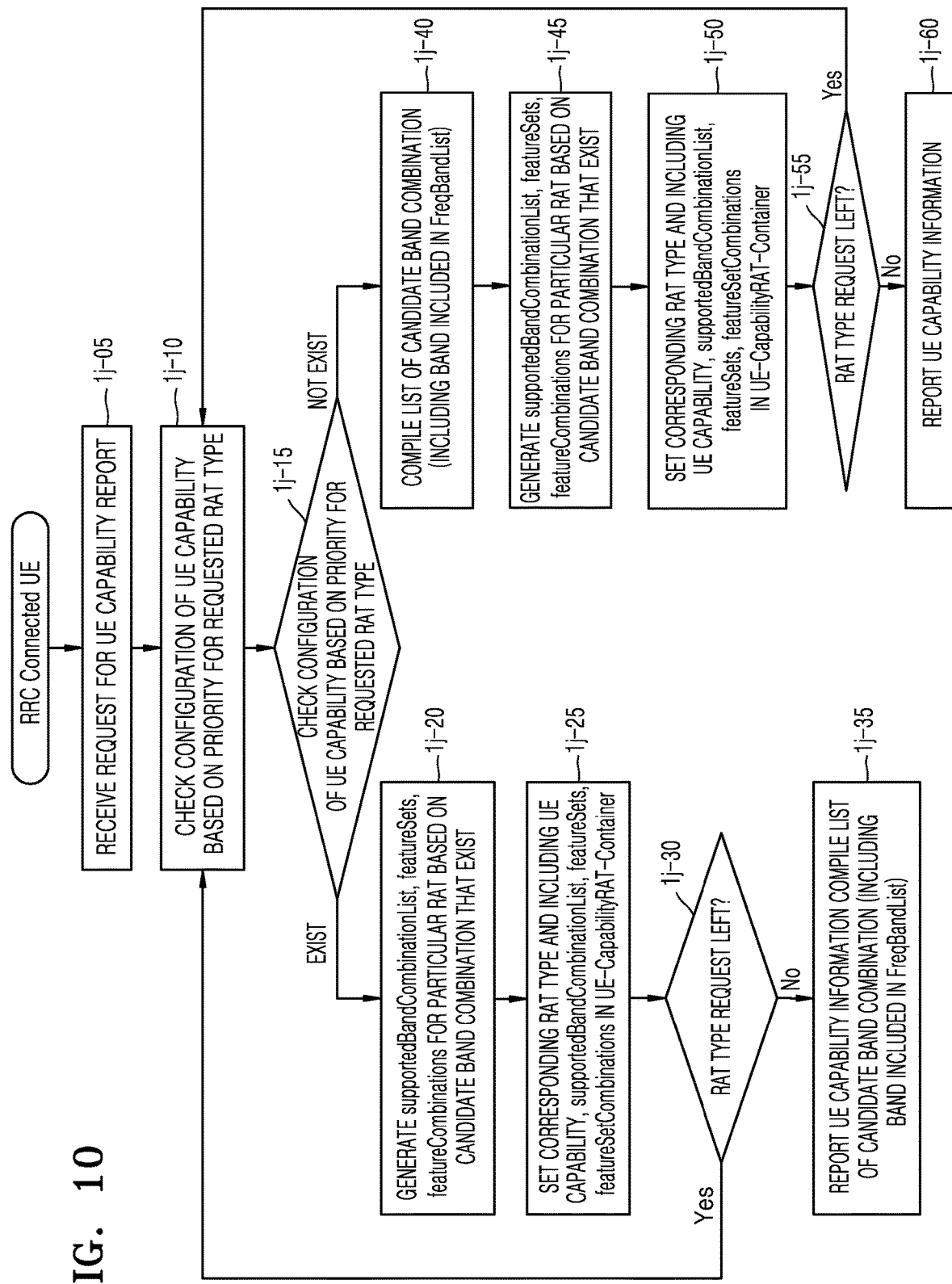
FIG. 10 shows an overall operation for reporting UE capability of a UE, according to an embodiment of the disclosure.

FIG. 10 shows overall operations for a UE to report UE capability, according to an embodiment of the disclosure.

Referring to FIG. 10, in operation 1j-05, the UE in an RRC connected state may receive a UE capability enquiry message requesting a report of UE capability from a BS. The UE capability enquiry message may include a request for a UE capability for each RAT type of the BS. The request for each RAT type may include frequency band information requested by the BS. Furthermore, the UE capability enquiry message may request UE capabilities for a plurality of RAT types in a single RRC message container. Alternatively, the BS may transmit the UE capability enquiry message including the request for each RAT type to the UE multiple times. Specifically, the UE capability enquiry messages may be repetitively transmitted, so the UE may configure a UE capability information message in response to the UE capability enquiry message, and report it to the BS by matching the response to the request. In the next generation mobile communication system, UE capabilities in NR, LTE, EN-DC, and MR-DC may be requested. For example, it is common to initially transmit the UE capability enquiry message after the UE makes a connection, but the UE capability enquiry may be requested whenever needed by the BS.

Upon receiving a request to report UE capability from the BS in operation 1j-05, the UE determines a configuration of UE capability to be reported for a RAT type and band information requested from the BS in operation 1j-10. In operation 1j-15, the UE checks whether there is a candidate BC generated using FreqBandList included for each RAT type in the UE capability enquiry message transmitted from the BS. The checking may be performed in the order of frequency priority (e.g., in the order of NR→MR-DC→LTE).

When there is a candidate BC already generated and stored according to a process for another RAT in operation 1j-15, the UE performs filtering on the stored candidate BC(s) for a corresponding RAT type and generates BCs and feature sets, and feature set combinations supported in the RAT in operation 1j-20. In operation 1j-25, the information of BCs, feature sets, and feature set combinations is set for the RAT type and contained in a UE capability container. In operation 1j-30, the UE checks whether there is a RAT type left unhandled, and when there is the RAT type left, returns to 1j-10 to repeat the procedure for each RAT type. On the other hand, when there is no RAT type left unhandled and the UE capability procedure for all RAT types has been performed, the UE transmits the UE capability information contained in the UE capability container for each RAT type to the BS in j-35.

When there is no candidate BC stored after operation 1j-15, the UE may generate candidate BCs by taking the received FreqBandList into account. In this case, all the candidate BCs that support NR SA, LTE SA and MR-DC may be selected. In other words, operation 1j-15 is not performed for each RAT type, and the UE generates candidate BCs to be applied to all the RAT types before performing the operation for each RAT type, thereby making a difference in that subsequently, the UE may be able to use the candidate BCs. Examples of detailed operations are summarized in FIGS. 8 and 9, and the operations are performed before a procedure for each RAT type and commonly applied (as in FIG. 8, in which case, operation 1j-40 may be performed at the same time when operation 1j-10 is performed), or performed once for each RAT (as in FIG. 9). In operation 1j-45, the UE performs filtering on the candidate BC(s) generated (or generated and stored) in operation 1j-40 for the corresponding RAT type and generates BCs and feature sets, and feature set combinations supported in the RAT. In operation 1j-50, the information of BCs, feature sets, and feature set combinations is set for the RAT type and contained in a UE capability container. In operation 1j-55, the UE checks whether there is a RAT type left unhandled, and when there is the RAT type left, returns to 1j-10 to repeat the procedure for each RAT type. On the other hand, when there is no RAT type left unhandled and the UE capability procedure for all RAT types has been performed, the UE transmits the UE capability information contained in the UE capability container for each RAT type to the BS in 1j-60.

Figure 17:
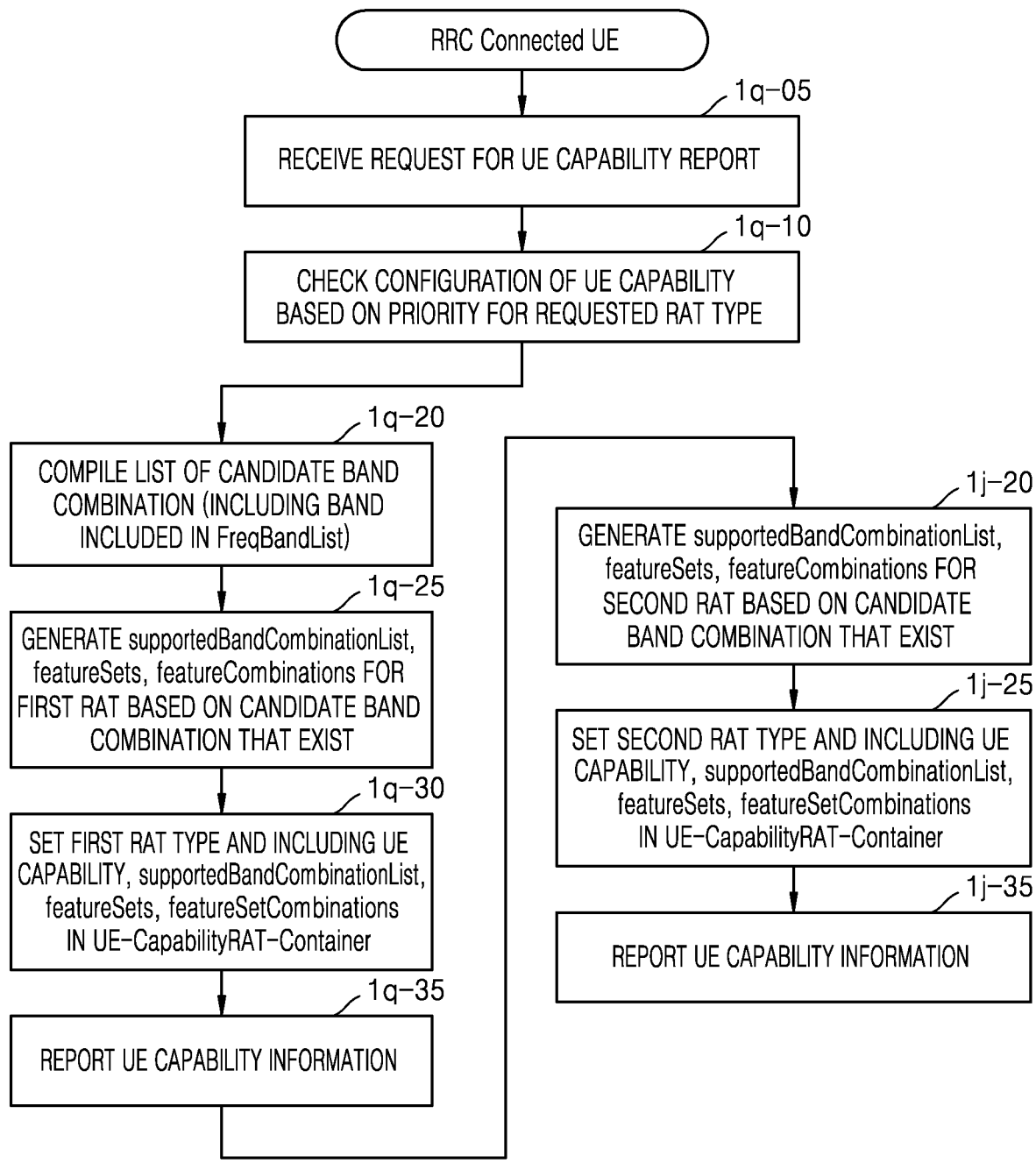
FIG. 17 shows an operation for a UE to report UE capability, according to an embodiment of the disclosure.

FIG. 17 shows an operation for a UE to report UE capability, according to an embodiment of the disclosure.

Referring to FIG. 17, in operation 1q-05, the UE in an RRC connected state may receive a UE capability enquiry message requesting a report of UE capability from a BS. The UE capability enquiry message may include a RAT type set by the BS. For the RAT type, frequency band information requested by the BS may be included. Furthermore, the UE capability enquiry message may request UE capabilities for a plurality of RAT types in a single RRC message container. Alternatively, the BS may transmit at least two UE capability enquiry messages each including the request for each RAT type to the UE. The UE capability enquiry may be repeated multiple times, so the UE may configure a UE capability information message in response to the UE capability enquiry, and report it to the BS by matching the response to the request. In the next generation mobile communication system, UE capabilities in NR, LTE, EN-DC, and MR-DC may be requested. For example, it is common to initially transmit the UE capability enquiry message after the UE establishes a connection, but the UE capability enquiry may be requested whenever needed by the BS.

Upon receiving a request to report UE capability from the BS in operation 1q-05, the UE checks a configuration of UE capability to be reported for a RAT type and band information requested from the BS n operation 1q-10. In an embodiment of the disclosure, for example, priorities of RAT types may be set based on frequency priority (e.g., NR→MR-DC→LTE).

The UE may generate candidate BCs by taking the received RAT type and FreqBandList into account. In this case, all the candidate BCs that support at least one of NR SA, LTE SA or MR-DC may be selected. In other words, generating candidate BCs is not performed for each RAT type, but may be performed for all RAT types supported by the UE among RAT types requested by the BS. Examples of detailed operations are summarized in FIGS. 8 and 9, and at least one of a method in which the operations are performed before a procedure for each RAT type and commonly applied (as in FIG. 8, in which case, operation 1q-20 may be performed at the same time when operation 1q-10 is performed), or a method in which the operations are performed once for each RAT (as in FIG. 9). In operation 1q-25, the UE performs filtering on the candidate BC(s) generated (or generated and stored) in operation 1q-20 for a first RAT type and generates BCs and feature sets, and feature set combinations supported in the first RAT. In operation 1q-30, the information of BCs, feature sets, and feature set combinations is set for the first RAT type and contained in a UE capability container. In 1q-35, the UE also transmits the UE capability information contained in the UE capability container for each RAT type to the BS. Alternatively, the UE may additionally include UE capability information for a second RAT and transmit it to the BS. In this case, operation 1q-35 may be skipped.

When there is a candidate BC generated and stored according to the process for the first RAT, the UE performs filtering on the stored candidate BC(s) for the second RAT type and generates BCs and feature sets, and feature set combinations supported in the second RAT in operation 1q-20. In operation 1q-25, the information of BCs, feature sets, and feature set combinations is set for the second RAT type and contained in a UE capability container. In 1q-35, the UE also transmits the UE capability information contained in the UE capability container for each RAT type to the BS. In another embodiment, when there is UE capability information for the first RAT left that has not been transmitted in operation 1q-35, a message including information for both the first RAT and second RAT may be transmitted to the BS.

Operations of the UE provided in the first embodiment are somewhat different from the first method (i.e., the method described referring to FIG. 8) and the second method (i.e., the method described referring to FIG. 9). A summary of the differences is as follows:

The first method (referring to FIG. 8): operation 1j-40 may be performed earlier than operation 1j-10. After this, the UE may repeat operations 1j-15 to 1j-30 as many as the number of remaining RAT types and stop the procedure in operation 1j-35.

The second method (referring to FIG. 9): the UE follows the UE operation procedure of FIG. 8 intact.

Figure 11:
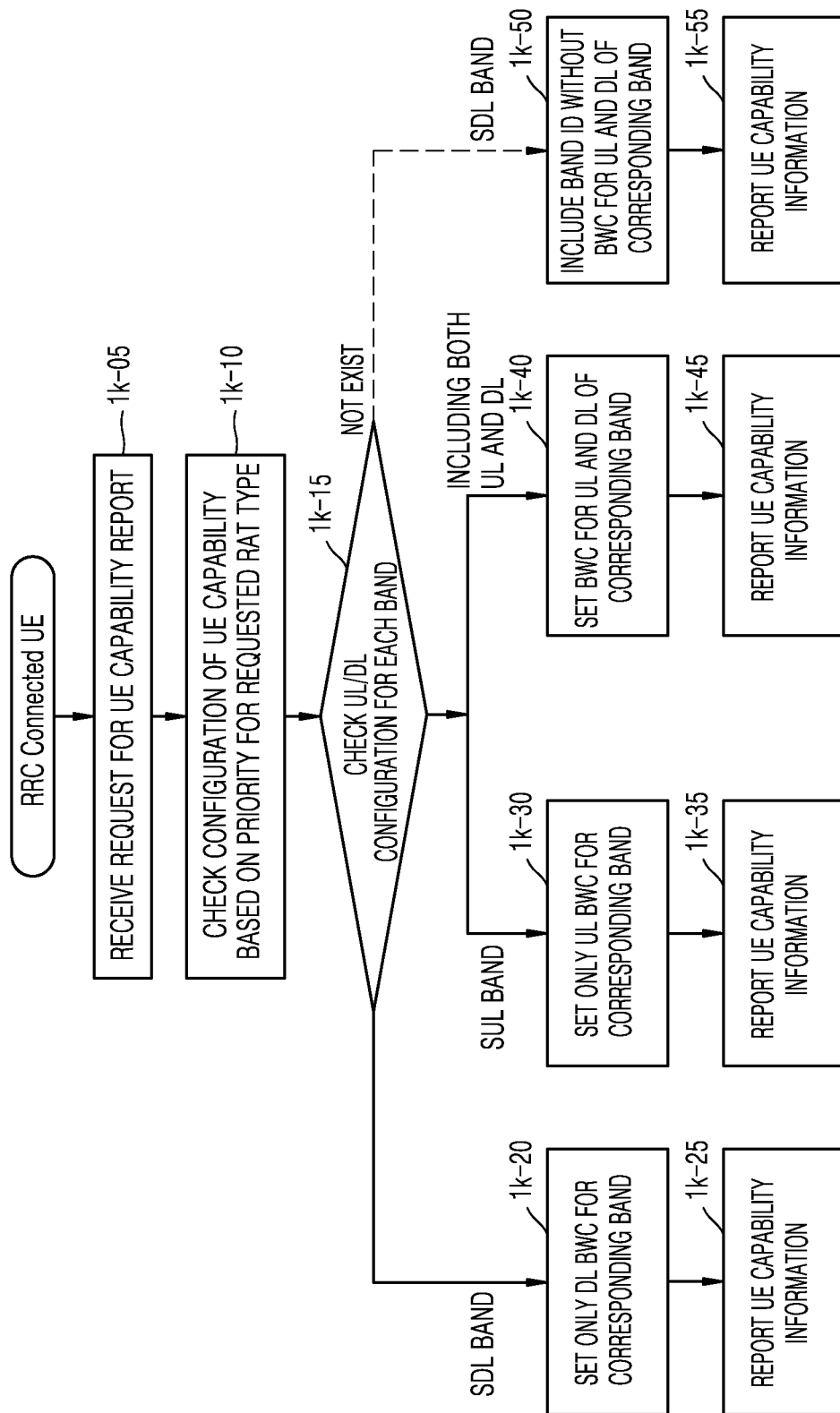
FIG. 11 shows how a UE signals a bandwidth class (BWC) for a band combination, according to an embodiment of the disclosure.

FIG. 11 shows how a UE signals a BWC for a BC, according to an embodiment of the disclosure.

Referring to FIG. 11, in operation 1k-05, the UE in an RRC connected state may receive a UE capability enquiry message requesting a report of UE capability from a BS. The UE capability enquiry message may include a request for a UE capability for each RAT type of the BS. The request for each RAT type may include frequency band information requested by the BS. Furthermore, the UE capability enquiry message may request UE capabilities for a plurality of RAT types in a single RRC message container. Alternatively, the BS may transmit the UE capability enquiry message including the request for each RAT type to the UE multiple times. Specifically, the UE capability enquiry messages may be repetitively transmitted, so the UE may configure a UE capability information message in response to the UE capability enquiry message, and report it to the BS by matching the response to the request. In the next generation mobile communication system, UE capabilities in at least one of NR, LTE, EN-DC, or MR-DC may be requested. For example, it is common to initially transmit the UE capability enquiry message after the UE establishes a connection, but the UE capability enquiry may be requested whenever needed by the BS. Upon receiving a request to report UE capability from the BS in operation 1k-05, the UE checks a configuration of UE capability to be reported for a RAT type and band information requested from the BS in operation 1k-10. Subsequently, the UE may check whether there is a candidate BC generated using FreqBandList included for each RAT type in the UE capability enquiry message transmitted from the BS. The checking may be performed in the order of frequency priority (e.g., in the order of NR→MR-DC→LTE). The UE may generate a supported BC for each RAT type using the candidate BCs and fill in the corresponding UE capability. For this, the UE may provide UL and DL bandwidth class (BWC) information of bands in the supported BC and frequency width information indicating how the UE may perform CA and DC in a corresponding BC. As described above in connection with FIG. 5, the UE may or may not include the UL and DL BWC for bands in a particular BC. In this embodiment, operations that the UE is able to perform for a possible band combination are provided.

In operation 1k-15, the UE determines how to support each band in the corresponding BC. The determining may be performed according to whether the band is a supplementary uplink (SUL) only frequency band, a supplementary downlink (SDL) only frequency band, or a UL/DL supported band.

When the band is an SDL band in operation 1k-15, the UE includes band index information for the band and a DL BWC in reporting the UE capability in operation 1k-20. After this, the UE stores other capabilities of the UE and transmits the UE capability to the BS, in operation 1k-25. When the band is a SUL band in operation 1k-15, the UE includes band index information for the band and a UL BWC in reporting the UE capability in operation 1k-30. After this, the UE stores other capabilities of the UE and reports the UE capability to the BS, in operation 1k-35. In an embodiment, when the corresponding band uses both UL and DL in operation 1k- 15, the UE includes both UL BWC and DL BWC in reporting the UE capability in operation 1k-40. After this, the UE stores other capabilities of the UE and transmits the UE capability to the BS, in operation 1k-45.

In another embodiment, when it is assumed that the corresponding band supports a minimum BWC in operation 1k-15, signaling related to this may be omitted, thereby attaining signaling optimization.

That is, using the methods provided as in FIG. 11, there are two possible methods as follows:

First BWC signaling method: In an embodiment, when the UE supports UL and DL BWCs for a particular band, band index information of the band and UL BWC and DL BWC information may be included in reporting the UE capability, in 1k-40. After this, the UE stores other capabilities of the UE in a container of the corresponding RAT type and transmits the UE capability to the BS, in operation 1k-45. In various embodiments, other capabilities of the UE may include many configurations included in the UE capability. In another embodiment, when the UE supports UL and DL BWCs for a particular band, band index information for the band and UL BWC and DL BWC information may be included in reporting the UE capability, in 1k-40. After this, the UE stores other capabilities of the UE and transmits the UE capability to the BS, in operation 1k-45. In this case, when the UE signals whether the UE supports at least one of UL or DL of a particular band, BWC information needs to be included in the signaling. Specifically, to ensure that a situation where only a band index is indicated without UL and DL BWC information never exists, the UE may not perform an operation that indicates a band index without UL and DL BWC information (In the first method, operations 1k-50 and 1k-55 may not be performed.)

When the first method is applied, the following words may be used in a standard document:

bandList

One entry for the list of band combination should include at least one bandwidth class for that band if the corresponding band is indicated;

bandList

For each band parameter included in the bandList, at least one bandwidth class shall be indicated;

bandList

For each entry, at least one bandwidth class is included.

2. Second BWC signaling method: In another embodiment, when the UE supports UL and DL BWCs for a particular band and DL for the band supports a minimum BWC, band index information of the band and a UL BWC may be included in reporting the UE capability, in 1k-40. After this, the UE stores other capabilities of the UE and transmits the UE capability to the BS, in operation 1k-45. In another embodiment, when the UE supports UL and DL BWCs for a particular band and UL for the band supports a minimum BWC, band index information for the band and a DL BWC may be included in reporting the UE capability, in 1k-40. After this, the UE stores other capabilities of the UE and transmits the UE capability to the BS, in operation 1k-45. In other words, the UE includes the band index for the band in a UE capability report while leaving out the UL or DL BWC information, in 1k-50. After this, the UE stores other capabilities of the UE and transmits the UE capability to the BS, in operation 1k-55. Operations 1k-50 and 1k-55 may be optionally performed, and the UE may not always perform the operations. For example, even when the UE supports a basic (minimum) BWC for UL or DL, whether the band is supported may be explicitly signaled.

Figure 12:
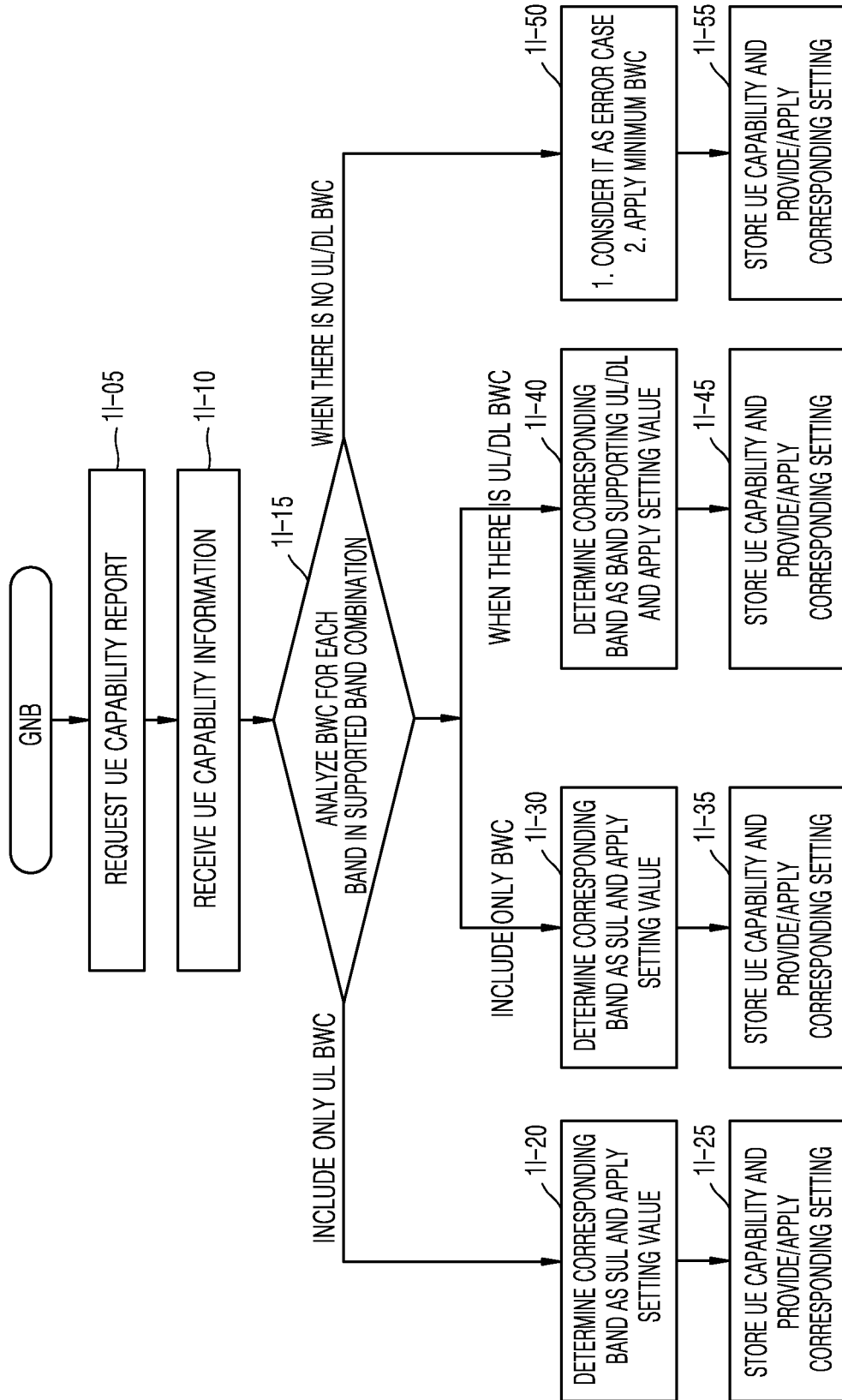
FIG. 12 shows how a base station (BS) interprets a BWC for a band combination when the BS receives the BWC, according to an embodiment of the disclosure.

FIG. 12 shows how a BS interprets a BWC for a band combination when the BS receives the BWC, according to an embodiment of the disclosure.

Referring to FIG. 12, in operation 1l-05, the BS (e.g., a gNB) transmits a UE capability report enquiry message requesting the UE to report UE capability. The BS may include a single piece of frequency filtering information for a plurality of RAT types in the UE capability report enquiry message. In operation 1l-10, the BS receives a message of UE capability information supported by the UE from the UE. And, the UE capability information may be analyzed. In operation 1l-15, the BS analyzes the information, in particular, the capability for each band in a particular band combination as described above in the embodiments of the disclosure.

When the UE capability information received by the BS includes a band index and UL BWC information for each band in a particular band combination, the UE determines that the band corresponds to SUL in operation 1*l*-20 and stores and sets settings for the band in 1*l*-25. Subsequently, the BS may refer to the settings for the band for CA, DC, or SUL establishment for the band. When the UE capability information includes a band index and DL BWC information for each band in a particular band combination, the UE determines that the band corresponds to SDL in operation 1*l*-30 and stores and sets settings for the band in 1*l*-35. Subsequently, the BS may refer to the settings for the band for CA, DC, or SDL establishment for the band. Furthermore, when the UE capability information includes a band index and both UL BWC and DL BWC information for each band in a particular band combination, the UE determines that the band is support for general UL/DL in operation 1*l*-40 and stores and sets settings for the band in 1*l*-45. Subsequently, the BS may refer to the settings for the band for CA and DC for the band.

However, in operation 1*l*-15, when a band index but no UL BWC nor DL BWC for each band in a particular band combination is signaled from the UE to the BS, the BS may operate according to the following two methods. The following operations may vary depending on whether the first BWC signaling method or the second BWC signaling method provided as in FIG. 11 is applied.

When the first BWC signaling method is applied, in operation 1*l*-50, the BS determines that a procedure of UE reporting for a band does not conform to a standard. Specifically, the BS may determine that there has been an error during operation of the UE, and use at least one of a method of leaving out establishment of the band or a method of characterizing the band as a band supporting a minimum (basic) BWC and establishing the band, in 1*l*-55. In the latter case, the BS may determine that the band has a minimum (or basic) bandwidth class. When the second BWC signaling method is applied, in operation 1*l*-50, the BS may characterize the band as a band supporting a minimum (basic) BWC and establish the band in 1*l*-55. That is, the band is characterized as having a minimum (or basic) bandwidth class. The minimum (or basic) bandwidth class may be defined to be one of A to L in the following Table 4 (for 6 GHz or lower operating frequencies) or A to Q in Table 5 (for 6 GHZ or higher operating frequencies). The BS may transmit information relating to the BWC to the UE.

TABLE 4

| NR CA bandwidth class | Aggregated channel bandwidth | Number of contiguous CC | Fallback group |
|---|---|---|---|
| A | $BW_{Channel\_CA} \leq BW_{Channel, max}$ | 1 | |
| B | $20\ MHz \leq BW_{Channel\_CA} \leq 50\ MHz$ | 2 | |
| C | $100\ MHz < BW_{Channel\_CA} \leq 2 \times BW_{Channel, max}$ | 2 | 1 |
| D | $200\ MHz < BW_{Channel\_CA} \leq 3 \times BW_{Channel, max}$ | 3 | |
| E | $300\ MHZ < BW_{Channel\_CA} \leq 4 \times BW_{Channel, max}$ | 4 | |
| F | $50\ MHZ < BW_{Channel\_CA} \leq 100\ MHz$ | 2 | 2 |
| G | $100\ MHz < BW_{Channel\_CA} \leq 150\ MHz$ | 3 | |
| H | $150\ MHz < BW_{Channel\_CA} \leq 200\ MHz$ | 4 | |
| I | $200\ MHz < BW_{Channel\_CA} \leq 250\ MHz$ | 5 | |
| J | $250\ MHz < BW_{Channel\_CA} \leq 300\ MHz$ | 6 | |
| K | $300\ MHz < BW_{Channel\_CA} \leq 350\ MHz$ | 7 | |
| L | $350\ MHz < BW_{Channel\_CA} \leq 400\ MHz$ | 8 | |

NOTE 1:
$BW_{Channel, max}$ is maximum channel, bandwidth supported among all bands in a release NOTE 2:
It is mandatory for a UE to be able to fallback to lower order CA bandwidth class configuration within a fallback group, It is not mandatory for a UE to be able to fallback to lower order CA bandwidth class configuration that belong to a different fallback group

TABLE 5

| NR CA bandwidth class | Aggregated channel bandwidth | Number of contiguous CC | Fallback group |
|---|---|---|---|
| A | $BW_{Channel} \leq 400\ MHz$ | 1 | |
| B | $400\ MHz < BW_{Channel\_CA} \leq 800\ MHz$ | 2 | 1 |
| C | $800\ MHz < BW_{Channel\_CA} \leq 1200\ MHz$ | 3 | |
| D | $200\ MHz < BW_{Channel\_CA} \leq 400\ MHz$ | 2 | 2 |
| E | $400\ MHz < BW_{Channel\_CA} \leq 600\ MHz$ | 3 | |
| F | $600\ MHz < BW_{Channel\_CA} \leq 800\ MHz$ | 4 | |
| G | $100\ MHz < BW_{Channel\_CA} \leq 200\ MHz$ | 2 | 3 |
| H | $200\ MHz < BW_{Channel\_CA} \leq 300\ MHz$ | 3 | |
| I | $300\ MHz < BW_{Channel\_CA} \leq 400\ MHz$ | 4 | |
| J | $400\ MHz < BW_{Channel\_CA} \leq 500\ MHz$ | 5 | |
| K | $500\ MHz < BW_{Channel\_CA} \leq 600\ MHz$ | 6 | |
| L | $600\ MHz < BW_{Channel\_CA} \leq 700\ MHz$ | 7 | |
| M | $700\ MHz < BW_{Channel\_CA} \leq 800\ MHz$ | 8 | |

TABLE 5-continued

| NR CA bandwidth class | Aggregated channel bandwidth | Number of contiguous CC | Fallback group |
|---|---|---|---|
| O | 100 MHz ≤ $BW_{Channel\_CA}$ ≤ 200 MHz | 2 | 4 |
| P | 150 MHz ≤ $BW_{Channel\_CA}$ ≤ 300 MHz | 3 | |
| Q | 200 MHz ≤ $BW_{Channel\_CA}$ ≤ 400 MHz | 4 | |

NOTE 1:
Maximum supported component carrier bandwidths for fallback groups 1, 2, 3 and 4 are 400 MHz, 200 MHz, 100 MHz and 100 MHz respectively.

NOTE 2:
It is mandatory for a UE to be able to fallback to lower order CA bandwidth class configuration within a fallback group. It is not mandatory for a UE to be able to fallback to lower order CA bandwidth class configuration that belong to a different fallback group.

Figure 13:
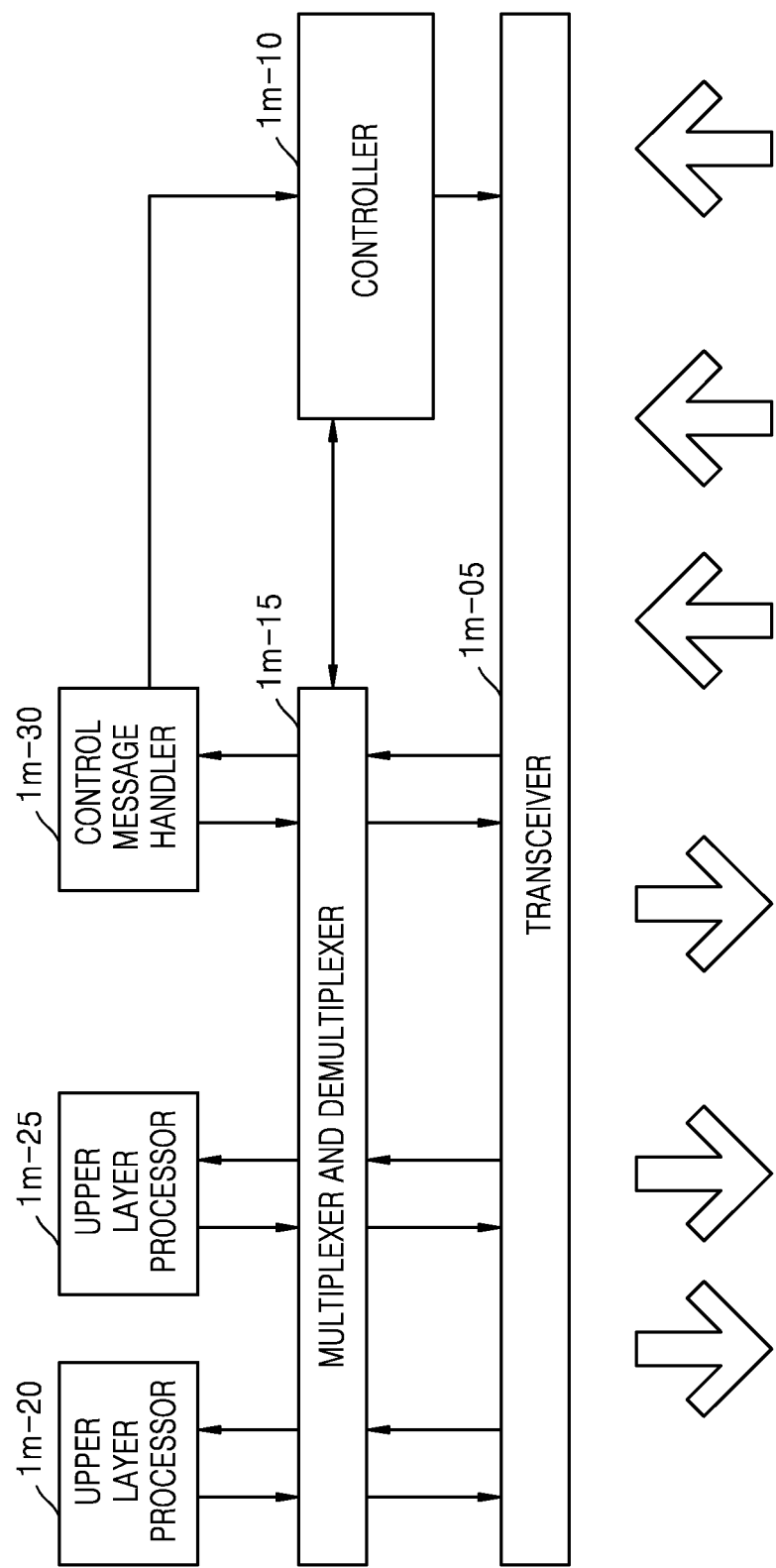
FIG. 13 is a block diagram of a UE, according to an embodiment of the disclosure.

FIG. 13 is a block diagram of a UE, according to an embodiment of the disclosure.

Referring to FIG. 13, the UE may include a transceiver 1m-05, a controller 1m-10, a multiplexer and demultiplexer 1m-15, various upper layer processors 1m-20 and 1m-25, and control message processor 1m-30.

The transceiver 1m-05 may receive data and certain control signals on a forward channel of a serving cell, and transmit data and certain control signals on a backward channel When multiple serving cells are set up, the transceiver 1m-05 may perform data transmission or reception and control signal transmission or reception through the multiple serving cells. The multiplexer and demultiplexer 1m-15 may multiplex data generated in the upper layer processors 1m-20 and 1m-25 or the control message processor 1m-30, or demultiplex data received from the transceiver 1m-05 and deliver the multiplexing or demultiplexing result to the upper layer processors 1m-20 and 1m-25 or the control message processor 1m-30. The control message processor 1m-30 may transmit or receive a control message to or from a BS and perform a required operation. For example, the required operation may include an operation to process a control message such as an RRC message and a MAC CE. The upper layer processors 1m-20 and 1m-25may refer to DRB devices and may be configured for each service. The upper layer processors 1m-20 and 1m-25 may process data generated in user services, such as File Transfer Protocol (FTP) or Voice over Internet Protocol (VoIP) and deliver the result to the multiplexer and demultiplexer 1m-15, or process data delivered from the multiplexer and demultiplexer 1m-15 and deliver the result to an upper layer service application. The controller 1m-10 may check a scheduling command, e.g., backward grants received through the transceiver 1 m-05, and control the transceiver 1m-05 and the multiplexer and demultiplexer 1m-15 to perform backward transmission on a proper transmission resource at a suitable point of time. Although the UE is shown to include a plurality of blocks, each block performing a different function, referring to FIG. 13, this is merely an example and the disclosure is not limited thereto. For example, the controller 1m- 10 itself may perform the functions of the multiplexer and demultiplexer 1m-15.

Figure 18:
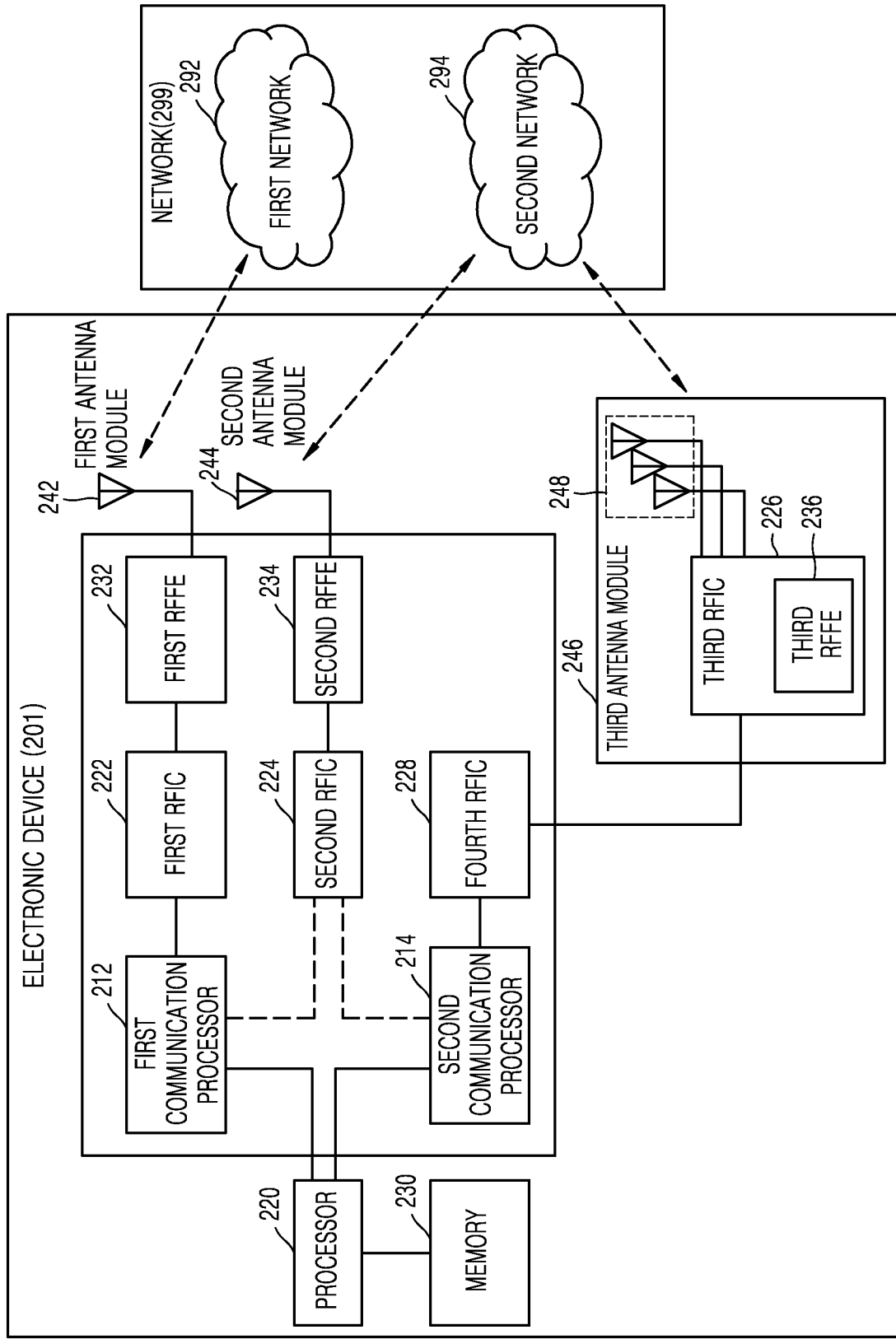
FIG. 18 is a block diagram of an electronic device for supporting legacy network communication and fifth generation (5G) network communication, according to an embodiment of the disclosure.

FIG. 18 is a block diagram of an electronic device for supporting legacy network communication and fifth generation (5G) network communication, according to an embodiment of the disclosure.

Referring to FIG. 18, an electronic device 201 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 201 may further include a processor 220 and a memory 230. A network 299 may include a first network 292 and a second network 294. In another embodiment, the electronic device 201 may further include at least one of the components referring to FIG. 18, and the network 299 may further include at least one of other networks. In an embodiment, the first communication processor 212, the second communication processor 214, the first RFIC 222, the second RFIC 224, the first RFFE 232 and the second RFFE 234 may form at least a portion of a wireless communication module 296. In another embodiment, the fourth RFIC 228 may be omitted or included as a part of the third RFIC 226.

The first communication processor 212 may support establishment of a communication channel of a band to be used in wireless communication with the first network 292 and legacy network communication through the established communication channel. In various embodiments, the first network may be a legacy network including a second generation (2G), 3G, 4G, or LTE network. The second communication processor 214 may support establishment of a communication channel corresponding to a designated band (e.g., about6 GHz to about60 GHz) among bands to be used in wireless communication with the second network 294 and5G network communication through the established communication channel. In various embodiments of the disclosure, the second network 294 may be a5G network defined by the3GPP. Furthermore, in an embodiment, the first communication processor 212 or the second communication processor 214 may support establishment of a communication channel corresponding to another designated band (e.g., about6 GHz or less) among the bands to be used in wireless communication with the second network 294 and5G network communication through the established communication channel In an embodiment of the disclosure, the first and second communication processors 212 and 214 may be implemented in a single chip or a single package. In various embodiments of the disclosure, the first or second communication processor 212 or 214 may be integrated with the processor 220, an auxiliary processor 223, or the communication module 290 in a single chip or a single package.

For transmission, the first RFIC 2222 may convert a baseband signal generated by the first communication processor 2212 to a radio frequency (RF) signal of about700 MHz to about3 GHz used for the first network 292 (e.g., a legacy network). An RF signal may be received from the first network 292 (e.g., the legacy network) through an antenna (e.g., the first antenna module 242), and preprocessed through an RFFE (e.g., the first RFFE 232)). The first RFIC 222 may convert the preprocessed RF signal to a baseband signal to be processed by the first communication processor 212.

For transmission, the second RFIC 224 may convert a baseband signal generated by the first or second communication processor 212 or 214 to an RF signal (hereinafter, referred to as a5G Sub6 RF signal) of a sub6 band (e.g., about 6 GHz or less) used in the second network 294 (e.g., a 5G network). A 5G Sub6 RF signal may be received from the second network 294 (e.g., the 5G network) through an antenna (e.g., the second antenna module 244), and preprocessed through an RFFE (e.g., the second RFFE 234)). The second RFIC 224 may convert the preprocessed 5G Sub6 RF signal to a baseband signal to be processed by corresponding one of the first and second communication processors 212 and 214.

The third RFIC 226 may convert a baseband signal generated by the second communication processor 214 to an RF signal (hereinafter, referred to as a 5G Above6 RF signal) of a 5G Above6 band (e.g., about 6 GHz to about 60 Ghz) used in the second network 294 (e.g., the 5G network). A 5G Above6 RF signal may be received from the second network 294 (e.g., the 5G network) through an antenna (e.g., the antenna 248), and preprocessed through the third RFFE 236. The third RFIC 226 may convert the preprocessed 5G Above6 RF signal to a baseband signal to be processed by the second communication processor 214. In an embodiment of the disclosure, the third RFFE 236 may be implemented as a part of the third RFIC 226.

In an embodiment of the disclosure, the electronic device 201 may include the fourth RFIC 228 separately from or as at least part of the third RFIC 226. In this case, the fourth RFIC 228 may convert the baseband signal generated by the second communication processor 214 to an RF signal (hereinafter, called an IF signal) of an intermediate frequency band (e.g., about 9 GHz to about 11 GHz), and transmit the IF signal to the third RFIC 226. The third RFIC 226 may convert the IF signal to a 5G Above6 RF signal. A 5G Above6 RF signal may be received from the second network 294 (e.g., the 5G network) through an antenna (e.g., the antenna 248), and converted to an IF signal by the third RFIC 226. The fourth RFIC 228 may convert an IF signal to a baseband signal to be processed by the second communication processor 214.

In an embodiment of the disclosure, the first and second RFICs 222 and 224 may be implemented as at least part of a single chip or a single package. In an embodiment of the disclosure, the first and second RFFEs 232 and 234 may be implemented as at least part of a single chip or a single package. In an embodiment of the disclosure, at least one of the first antenna module 242 or the second antenna module 244 may be omitted or combined with another antenna module to process corresponding RF signals of a plurality of bands.

In an embodiment of the disclosure, the third RFIC 226 and the antenna 248 may be arranged on the same substrate to form the third antenna module 246. For example, the wireless communication module 296 or the processor 220 may be arranged on a first substrate (e.g., a main printed circuit board (PCB)). In this case, the third antenna module 246 may be formed with the third RFIC 226 arranged in some portions (e.g., the bottom surface) of a second substrate (e.g., a sub PCB) separate from the first substrate and the antenna 248 arranged in some other portions (e.g., the top surface) of the second substrate. In an embodiment of the disclosure, the antenna 248 may include, for example, an antenna array to be used for beamforming The length of a transmission path between the third RFIC 226 and the antenna 248 may be reduced by arranging the third RFIC 226 and the antenna 248 on the same substrate. This may lead to a reduction in loss (attenuation) of a signal of a high frequency band (e.g., about 6 GHz to about 60 GHz) used for 5G network communication. Accordingly, the electronic device 201 may increase quality or speed of communication with the second network (e.g., the 5G network) 294.

The second network (e.g., the 5G network) 294 may be operated independently of the first network (e.g., the legacy network) 292, i.e., standalone (SA), or operated while connected to the first network 292, i.e., non-standalone (NSA). For example, the 5G network may include an access network (e.g., a 5G radio access network (RAN) or a next generation RAN (NG RAN)) but no core network (e.g., a next generation core (NGC)). In this case, the electronic device 201 may access the access network of the 5G network and then access an external network (e.g., the Internet) under the control of a core network (e.g., an evolved packed core (EPC)) of the legacy network. Protocol information for communication with the legacy network (e.g., LTE protocol information) or for communication with the 5G network (e.g., NR protocol information) may be stored in the memory 230 and subsequently, accessed by other components (e.g., the processor 220, the first or second communication processor 212 or 214).

Figure 14:
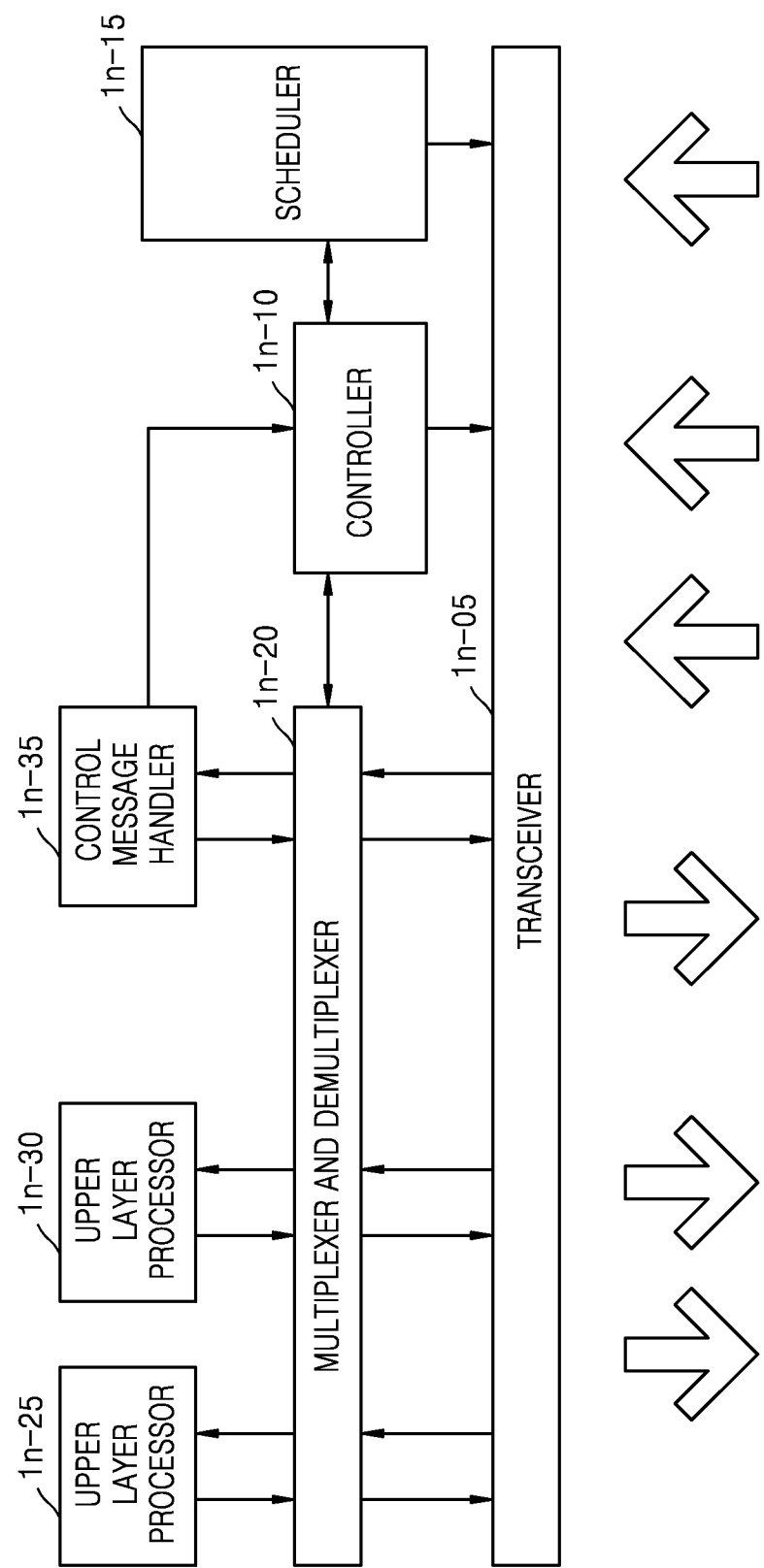
FIG. 14 is a block diagram of a BS, according to an embodiment of the disclosure.

FIG. 14 is a block diagram of a BS, according to an embodiment of the disclosure.

Referring to FIG. 14, the BS may include a transceiver 1n-05, a controller 1n-10, a multiplexer and demultiplexer 1n-20, a control message processor 1n-35, various upper layer processors 1n-25 and 1n-30, and a scheduler 1n-15.

The transceiver 1n-05 may transmit data and certain control signals on a forward carrier, and receive data and certain control signals on a backward carrier. When multiple carriers are set up, the transceiver 1n-05 may perform data transmission and reception and control signal transmission and reception with the multiple carriers. The multiplexer and demultiplexer 1n-20 may serve to multiplex data generated in the upper layer processors 1n-25 and 1n-30 or the control message processor 1n-35 or demultiplex data received from the transceiver 1n-05 and deliver the multiplexing or demultiplexing result to the upper layer processors 1n-25 and 1n-30, the control message processor 1n-35, or the controller 1n-10. The control message processor 1n-35 may receive an instruction from the controller 1n-10 to generate a control message and deliver the control message to a lower layer. The upper layer processors 1n-25 and 1n-30 may be configured for each service of each UE, and process data generated in user services, such as FTP or VoIP and deliver the result to the multiplexer and demultiplexer 1n-20, or process data delivered from the multiplexer and demultiplexer 1n-20 and deliver the result to an upper layer service application. The scheduler 1n-15 may allocate transmission resources to the UE at a proper point of time by taking into account a buffer status of the UE, a channel condition, Active Time of the UE, etc., and handle the transceiver 1n-05 to process signals transmitted from the UE or transmit signals to the UE. Although the BS is shown to include a plurality of blocks, each block performing a different function, referring to FIG. 14, this is merely an example and the disclosure is not limited thereto. For example, the controller 1n-10 itself may perform the functions of the multiplexer and demultiplexer 1n-20 or the scheduler 1n-15.

Figure 19:
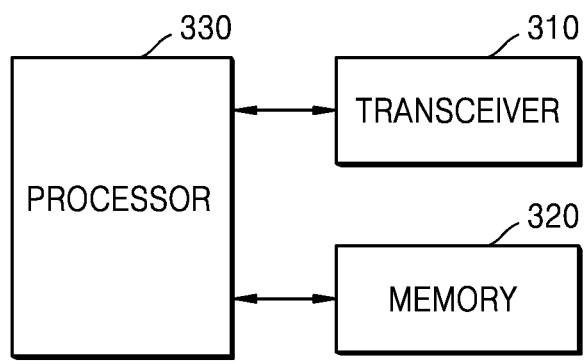
FIG. 19 is a block diagram of a BS in a wireless communication system, according to an embodiment of the disclosure.

FIG. 19 is a block diagram of a BS, according to an embodiment of the disclosure.

Referring to FIG. 19, the BS may include a processor 330, a transceiver 310, and a memory 320. Components of the BS are not, however, limited thereto. For example, the BS may include more or fewer elements than described above. In addition, the processor 330, the transceiver 310, and the memory 320 may be implemented in a single chip.

The processor 330 may control a series of processes for the BS to be operated according to the embodiments of the disclosure. For example, the processor 330 may control the components of the BS to perform a method of receiving a UE capability report in a wireless communication system according to embodiments of the disclosure.

The transceiver 310 may transmit or receive signals to or from a UE. The signals to be transmitted to or received from the UE may include control information and data. The transceiver 310 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 310 are not limited to the RF transmitter and RF receiver. In addition, the transceiver 310 may receive a signal on a wireless channel and output the signal to the processor 330, or transmit a signal output from the processor 330 on a wireless channel The processor 330 may be provided in the plural, which may perform the method of receiving a UE capability report in a wireless communication system as described above by carrying out a program stored in the memory 320.

In some embodiments of the disclosure, the memory 320 may store a program and data required for operation of the BS. Furthermore, the memory 320 may store control information or data included in a signal transmitted or received by the BS. The memory 320 may include a storage medium such as a read only memory (ROM), a random-access memory (RAM), a hard disk, a compact disc (CD)-ROM, and a digital versatile disc (DVD), or a combination of storage mediums. Moreover, the memory 320 may be provided in a multiple number. In some embodiments of the disclosure, the memory 320 may store a program to perform the method of receiving a UE capability report in a wireless communication system as described above. Methods according to the claims of the disclosure or the embodiments described in the specification may be implemented in hardware, software, or a combination of hardware and software. Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In an embodiment of the disclosure, an operation method of a UE in a wireless communication system includes receiving a control message requesting a report of band combinations (BCs) from a BS; and transmitting a radio resource control (RRC) message including a supported BC list to the BS in response to the control message, wherein the transmitting of the RRC message including the supported BC list to the BS in response to the control message includes generating a list of all possible BCs of the UE with common candidate BCs applied without regard to radio access technology (RAT) information; generating BCs supported for each RAT type by filtering the generated BC list to take a BC list corresponding to the RAT information included in the control message; generating feature sets and feature set combinations based on the generated BCs supported for each RAT type; and storing a generated UE capability for each RAT type and transmitting the UE capability to the BS, wherein the control message includes at least one piece of RAT information for report.

In an embodiment of the disclosure, the generating of the list of all possible BCs of the UE may include generating a list of all possible candidate BCs of the UE without regard to the RAT information received from the BS; storing the generated list of common candidate BCs; and fetching and applying a list corresponding to the RAT type in generating a UE capability when a UE capability for each RAT type is stored.

In an embodiment, the transmitting of the RRC message including a supported BC list to the BS in response to the control message may include generating a list of all possible BCs of the UE when there are two or more pieces of RAT information in the control message; transmitting a BC list related to first RAT information included in the control message among the generated list of all possible BCs based on the first RAT information; and transmitting a BC list related to second RAT information included in the control message among the generated list of all possible BCs based on the second RAT information.

In an embodiment, a long-term evolution (LTE) band and a new radio (NR) band may use different subcarrier spacings (SCSs), and the NR band may be operated based on one or more SCSs.

In an embodiment of the disclosure, an operation method of a UE in a wireless communication system may include selectively receiving a control message requesting a report of band combinations (BCs) from a BS; and transmitting a radio resource control (RRC) message including a supported BC list to the BS in response to the control message, wherein the BC list is generated with at least one BC, and the BC is configured with at least one piece of information about at least one band supported by the UE, wherein the at least one piece of information about the band includes at least one of a downlink (DL) bandwidth class (BWC) or an uplink (UL) BWC supported by the UE, and wherein for the DL BWC and UL BWC supported by the UE for the band, a band to which a minimum BWC is applied is reported using BCs configured with band index information without using BWC information.

In an embodiment of the disclosure, when the at least one piece of information about the band includes only the DL BWC, the BS may characterize the band as being supported by the UE operating in supplementary downlink (SDL).

Furthermore, when the at least one piece of information about the band includes only the UL BWC, the BS may characterize the band as being supported by the UE operating in supplementary uplink (SUL).

Furthermore, when the at least one piece of information about the band includes both the DL BWC and UL BWC, the BS may characterize the band as being supported by the UE operating in both DL and UL.

Moreover, when the at least one piece of information about the band does not include the DL BWC and UL BWC, the BS may characterize the band as not being supported by the UE.

In addition, when the at least one piece of information about the band does not include the DL BWC and UL BWC, the BS may characterize the band as having the UE support a minimum BWC.

In an embodiment of the disclosure, when the at least one piece of information about the band includes both the DL BWC and UL BWC and the DL BWC and the UL BWC are identical, the BS may characterize the band as having the UE support time division duplexing (TDD). Furthermore, when the at least one piece of information about the band includes both the DL BWC and UL BWC and the DL BWC and the UL BWC are different, the BS may characterize the band as having the UE support frequency division duplexing (FDD).

In an embodiment of the disclosure, the at least one piece of information for the band may include information about an Evolved Universal Terrestrial Radio Access (EUTRA) band or an NR band, the DL BWC may represent the number of cells and an integrated DL BWC, the DL BWC may be classified into information about the EUTRA band and information about the NR band, the UL BWC may represent the number of cells and an integrated UL BWC, the UL BWC may be classified into information about the EUTRA band and information about the NR band, and band parameters of a first band (an FDD band) may include both the DL BWC and the UL BWC or may include only DL BWC.

Furthermore, when the DL BWC and the UL BWC are both included, the DL BWC and the UL BWC may be identical or different.

Moreover, when both the DL BWC and the UL BWC are not included, the DL BWC and the UL BWC may be interpreted as having a minimum BWC.

Furthermore, band parameters of a second band (a TDD band) may include both the DL BWC and the UL BWC or may include only DL BWC.

Furthermore, when the DL BWC and the UL BWC are both included, the DL BWC and the UL BWC may be identical.

Moreover, when both the DL BWC and the UL BWC are not included, the DL BWC and the UL BWC may be interpreted as having a minimum BWC.

In addition, the NR band may include a band including only DL (SDL), and band parameters for the SDL band may include a DL BWC.

In an embodiment of the disclosure, a long-term evolution (LTE) band and a new radio (NR) band may use different subcarrier spacings (SCSs), the NR band may include a band including only UL (SUL), and band parameters for the SUL band may include a UL BWC.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

The embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure, which have been provided only for illustrative purposes. Furthermore, the embodiments of the disclosure may be operated by being combined with one another when necessary. For example, an embodiment of the disclosure and some of another embodiment of the disclosure may be combined to operate the BS and the UE. Although the embodiments of the disclosure are provided with respect to an FDD LTE system, modifications of the embodiments of the disclosure based on the technical idea of the above embodiments of the disclosure may also be employed by other systems such as a TDD LTE system, a 5G or NR system, etc.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a base station, a request message for reporting of UE capability, wherein the request message includes information for a plurality of radio access technology (RAT) types and information for a frequency band list associated with the plurality of RAT types;
   determining UE capability information corresponding to at least one RAT type among the plurality of RAT types, based on the information for the plurality of RAT types and the information for the frequency band list,
   wherein the determining of the UE capability information corresponding to the at least one RAT type comprises generating the UE capability information for each RAT type included in the plurality of the RAT types based on a predetermined priority for the plurality of RAT types, and
   wherein the generating of the UE capability information comprises:
      generating a candidate band combination that supports a first RAT type, based on information for a frequency band that supports the first RAT type among the plurality of the RAT types;
      storing the candidate band combination that supports the first RAT type;
      generating parameters corresponding to the first RAT type by performing a filtering procedure corresponding to the first RAT type for the candidate band combination that supports the first RAT type; and
      adding the parameters corresponding to the first RAT type to the UE capability information; and transmitting, to the base station, the UE capability information corresponding to the at least one RAT type, wherein the UE capability information corresponding to the at least one RAT type includes information for a frequency band corresponding to the at least one RAT type and information for bandwidth class of the frequency band corresponding to the at least one RAT type, and wherein the information for bandwidth class of the frequency band corresponding to the at least one RAT type includes at least one bandwidth class corresponding to at least one of uplink or downlink.

2. The method of claim 1, wherein the generating of the UE capability information further comprises:

based on the stored candidate band combination that supports the first RAT type being same as a candidate band combination that supports a second RAT type among the plurality of RAT types, generating parameters corresponding to the second RAT type by performing a filtering procedure corresponding to the second RAT type for the candidate band combination that supports the first RAT type, and adding the parameters corresponding to the second RAT type to the UE capability information.

3. The method of claim 2, wherein at least one of the parameters corresponding to the first RAT type or the parameters corresponding to the second RAT type include information for at least one of band combinations, feature sets or combination of the feature sets.

4. A method performed by a base station in a wireless communication system, the method comprising:

transmitting, to a user equipment (UE), a request message for reporting of UE capability, the request message including information for a plurality of RAT types and information for a frequency band list associated with the plurality of RAT types, wherein the UE capability information for each RAT type included in the plurality of the RAT types is generated based on a predetermined priority for the plurality of RAT types, wherein a candidate band combination that supports a first RAT type is generated based on information for a frequency band that supports the first RAT type among the plurality of the RAT types, wherein the candidate band combination that supports the first RAT type is stored, wherein parameters corresponding to the first RAT type by performing a filtering procedure corresponding to the first RAT type for the candidate band combination that supports the first RAT type are generated, and wherein the parameters corresponding to the first RAT type to the UE capability information is added; and receiving, from the UE, UE capability information corresponding to at least one RAT type among the plurality of the RAT types, wherein the first RAT type is included in the at least one RAT type, wherein the UE capability information corresponding to the at least one RAT type includes information for a frequency band corresponding to the at least one RAT type and information for bandwidth class of the frequency band corresponding to the at least one RAT type, and wherein the information for bandwidth class of the frequency band corresponding to the at least one RAT type includes at least one bandwidth class corresponding to at least one of uplink or downlink.

5. The method of claim 4, further comprising:

identifying whether the frequency band is a frequency band for uplink or downlink, and the bandwidth class of the frequency band based on the information for the frequency band corresponding to the at least one RAT type and the information for bandwidth class of the frequency band;

determining a setting value corresponding to the frequency band based on a result of the identifying; and storing the determined setting value.

6. The method of claim 5, wherein the identifying of whether the frequency band is a frequency band for uplink or downlink comprises:

based on the bandwidth class of the frequency band corresponding to the uplink, determining the frequency band as a frequency band for the uplink; and based on the bandwidth class of the frequency band corresponding to the downlink, determining the frequency band as a frequency band for the downlink.

7. The method of claim 4, further comprising:

based on a bandwidth class corresponding to the uplink and a bandwidth class corresponding to the downlink not being included in the UE capability information, applying predetermined bandwidth class for the frequency band corresponding to the at least one RAT type.

8. The method of claim 4, further comprising:

based on a bandwidth class corresponding to the uplink and a bandwidth class corresponding to the downlink not being included in the UE capability information, determining that the frequency band from a frequency band list corresponding to the at least one RAT type is not included in the UE capability information.

9. A user equipment (UE) in a wireless communication system, the UE comprising:

a transceiver; and at least one processor configured to:

receive via the transceiver, from a base station, a request message for reporting of UE capability, the request message including information for a plurality of RAT types and information for a frequency band list associated with the plurality of RAT types, determine UE capability information corresponding to at least one radio access technology (RAT) type among the plurality of RAT types, based on the information for the plurality of RAT types and the information for the frequency band list, and generate the UE capability information for each RAT type included in the plurality of the RAT types based on a predetermined priority for the plurality of RAT types, generate a candidate band combination that supports a first RAT type, based on information for a frequency band that supports the first RAT type among the plurality of the RAT types, store the candidate band combination that supports the first RAT type, generate parameters corresponding to the first RAT type by performing a filtering procedure corresponding to the first RAT type for the candidate band combination that supports the first RAT type, and add the parameters corresponding to the first RAT type to the UE capability information, and transmit via the transceiver, to the base station, the UE capability information corresponding to the at least one RAT type, wherein the UE capability information corresponding to the at least one RAT type includes information for a frequency band corresponding to the at least one RAT type and information for bandwidth class of the frequency band corresponding to the at least one RAT type, and wherein the information for bandwidth class of the frequency band corresponding to the at least one RAT type includes at least one bandwidth class corresponding to at least one of uplink or downlink.

10. The UE of claim 9, wherein the at least one processor is further configured to:

based on the stored candidate band combination that supports the first RAT type being same as a candidate band combination that supports a second RAT type among the plurality of RAT types, generate parameters corresponding to the second RAT type by performing a filtering procedure corresponding to the second RAT type for the candidate band combination that supports the first RAT type; and add the parameters corresponding to the second RAT type to the UE capability information.

11. The UE of claim 10, wherein at least one of the parameters corresponding to the first RAT type or the parameters corresponding to the second RAT type include information for at least one of band combinations, feature sets or combination of the feature sets.

12. A base station in a wireless communication system, the base station comprising:

a transceiver; and at least one processor configured to:

transmit via the transceiver, to a user equipment (UE), a request message for reporting of UE capability, wherein the request message comprises information for a plurality of radio access technology (RAT) types and information for frequency band list associated with the plurality of RAT types, wherein the UE capability information for each RAT type included in the plurality of the RAT types is generated based on a predetermined priority for the plurality of RAT types, wherein a candidate band combination that supports a first RAT type is generated based on information for a frequency band that supports the first RAT type among the plurality of the RAT types, wherein the candidate band combination that supports the first RAT type is stored, wherein parameters corresponding to the first RAT type by performing a filtering procedure corresponding to the first RAT type for the candidate band combination that supports the first RAT type are generated, and wherein the parameters corresponding to the first RAT type to the UE capability information is added, and receive via the transceiver, from the UE, UE capability information corresponding to at least one RAT type among the plurality of the RAT types, wherein the first RAT type is included in the at least one RAT type, wherein the UE capability information corresponding to the at least one RAT type includes information for a frequency band corresponding to the at least one RAT type and information for bandwidth class of the frequency band corresponding to the at least one RAT type, and wherein the information for bandwidth class of the frequency band corresponding to the at least one RAT type includes at least one bandwidth class corresponding to at least one of uplink or downlink.

13. The base station of claim 12, wherein the at least one processor is further configured to:

identify whether the frequency band is a frequency band for uplink or downlink, and the bandwidth class of the frequency band based on the information for the frequency band corresponding to the at least one RAT type and the information for bandwidth class of the frequency band, determine a setting value corresponding to the frequency band based on a result of the identifying, and store the determined setting value.

14. The base station of claim 13, wherein the at least one processor is further configured to:

based on the bandwidth class of the frequency band corresponding to the uplink, determine the frequency band as a frequency band for the uplink, and based on the bandwidth class of the frequency band corresponding to the downlink, determine the frequency band as a frequency band for the downlink.

15. The base station of claim 12, wherein the at least one processor is further configured to, based on a bandwidth class corresponding to the uplink and a bandwidth class corresponding to the downlink not being included in the UE capability information, apply a predetermined bandwidth class for the frequency band corresponding to the at least one RAT type.

16. The base station of claim 12, wherein the at least one processor is further configured to, based on a bandwidth class corresponding to the uplink and a bandwidth class corresponding to the downlink not being included in the UE capability information, determine that the frequency band from a frequency band list corresponding to the at least one RAT type is not included in the UE capability information.

* * * * *